(12) United States Patent
Dotsey et al.

(10) Patent No.: US 7,770,911 B2
(45) Date of Patent: *Aug. 10, 2010

(54) COLLAPSIBLE STROLLER

(75) Inventors: Michael A. Dotsey, Pottstown, PA (US); Todd D. Sorzano, Atglen, PA (US); Roy L. Dean, Pottstown, PA (US)

(73) Assignee: Graco Children's Products Inc., Atlanta, GA (US)

( * ) Notice: Subject to any disclaimer, the term of this patent is extended or adjusted under 35 U.S.C. 154(b) by 439 days.

This patent is subject to a terminal disclaimer.

(21) Appl. No.: 11/493,719

(22) Filed: Jul. 26, 2006

(65) Prior Publication Data

US 2006/0261576 A1 Nov. 23, 2006

Related U.S. Application Data

(62) Division of application No. 11/337,962, filed on Jan. 23, 2006.

(60) Provisional application No. 60/645,047, filed on Jan. 21, 2005.

(51) Int. Cl.
*B62B 7/00* (2006.01)

(52) U.S. Cl. ..................... 280/647; 280/642; 280/650; 280/658

(58) Field of Classification Search ................. 280/642, 280/650, 657, 658
See application file for complete search history.

(56) References Cited

U.S. PATENT DOCUMENTS 2,722,682 A 11/1955 Neiswinter (Continued)

FOREIGN PATENT DOCUMENTS

DE 298 01 610 U1 5/1998

(Continued)

OTHER PUBLICATIONS

International Search Report and Written Opinion from related International application No. PCT/US2006/002247 issued Jun. 21, 2006.

(Continued)

*Primary Examiner*—Paul N Dickson
*Assistant Examiner*—Katy Meyer
(74) *Attorney, Agent, or Firm*—Lempia Braidwood LLC

(57) ABSTRACT

A collapsible stroller has a frame structure collapsible between an in-use configuration and a compact or collapsed configuration. The stroller has a variety of features or accessories that improve collapsibility, as well as stroller function and comfort during use. A number of these features or accessories also permit three-dimensional collapse of the stroller frame structure without requiring removal or disassembly of these features or accessories. The stroller can have one or more of the following features or accessories: a storage basket under the seat with a basket access area that is unencumbered by parts of the stroller; a collapsible foot rest for the seat occupant; a collapsible tray for the seat occupant; a tray with feet that provide, in part, a stable base to stand the collapsed stroller in an upright orientation; a collapsible upper cross-brace behind the seat; a cup holder for the caregiver that is provided as part of the collapsible upper cross-brace; a collapsible lower cross-brace that does not inhibit the basket access area beneath and behind the seat; a brake system incorporated into the lower cross-brace; an easy two-step fold frame structure; and handles for the caregiver that are adjustable longitudinally and rotationally using a single actuator.

26 Claims, 27 Drawing Sheets

U.S. PATENT DOCUMENTS

| | | | |
|---|---|---|---|
| 4,077,641 A * | 3/1978 | Perego | 280/42 |
| 4,256,325 A | 3/1981 | Fleischer | |
| 4,335,893 A * | 6/1982 | Carmichael et al. | 280/42 |
| 4,506,907 A | 3/1985 | Miyagi | |
| 4,545,599 A | 10/1985 | Kassai et al. | |
| 4,587,864 A | 5/1986 | Kassai | |
| 4,606,550 A | 8/1986 | Cone | |
| 4,741,551 A * | 5/1988 | Perego | 280/642 |
| 4,768,795 A | 9/1988 | Mar | |
| 4,817,982 A * | 4/1989 | Kassai | 280/644 |
| 4,819,958 A | 4/1989 | Perego | |
| 4,856,809 A * | 8/1989 | Kohus et al. | 280/644 |
| 4,930,697 A | 6/1990 | Takahashi et al. | |
| 5,020,755 A | 6/1991 | Frankel | |
| 5,181,735 A | 1/1993 | Onishi | |
| 5,257,799 A | 11/1993 | Cone et al. | |
| 5,288,098 A | 2/1994 | Shamie | |
| 5,388,852 A | 2/1995 | Bigo et al. | |
| 5,437,493 A * | 8/1995 | Weisleder | 297/150 |
| 5,460,399 A * | 10/1995 | Baechler et al. | 280/650 |
| 5,464,183 A | 11/1995 | McConnell | |
| 5,472,224 A | 12/1995 | Cabagnero | |
| 5,625,923 A | 5/1997 | Huang | |
| 5,669,623 A | 9/1997 | Onishi | |
| 5,722,682 A * | 3/1998 | Wang | 280/642 |
| 5,725,238 A * | 3/1998 | Huang | 280/642 |
| 5,727,798 A | 3/1998 | Walters et al. | |
| 5,772,279 A | 6/1998 | Johnson et al. | |
| 5,816,648 A * | 10/1998 | Baccili et al. | 297/159.1 |
| 5,845,917 A | 12/1998 | Huang | |
| 5,857,601 A | 1/1999 | Greenwood | |
| 6,059,301 A | 5/2000 | Skarnulis | |
| 6,273,451 B1 * | 8/2001 | Julien et al. | 280/642 |
| 6,368,006 B1 | 4/2002 | Yang et al. | |
| 6,666,473 B2 | 12/2003 | Hartenstine et al. | |
| 6,857,511 B2 | 2/2005 | Lin et al. | |
| 6,874,604 B2 | 4/2005 | Miller et al. | |
| 6,892,866 B2 | 5/2005 | Wu | |
| 6,978,514 B2 | 12/2005 | Kuo et al. | |
| 7,017,936 B2 | 3/2006 | Huang | |
| 7,029,064 B2 * | 4/2006 | Chen | 297/16.1 |
| 7,077,423 B2 | 7/2006 | Hutchinson | |
| 2002/0005628 A1 * | 1/2002 | Hartenstine et al. | 280/647 |
| 2002/0074774 A1 | 6/2002 | Hsu et al. | |
| 2003/0057682 A1 * | 3/2003 | Yoshie et al. | 280/647 |
| 2003/0132590 A1 | 7/2003 | Werner | |
| 2003/0132614 A1 * | 7/2003 | Kreamer | 280/655.1 |
| 2003/0201625 A1 | 10/2003 | Espenshade et al. | |
| 2003/0201626 A1 * | 10/2003 | Hartenstine et al. | 280/642 |
| 2004/0094935 A1 | 5/2004 | Fair et al. | |
| 2004/0113394 A1 * | 6/2004 | Cheng | 280/647 |
| 2005/0242548 A1 | 11/2005 | Hutchinson et al. | |
| 2005/0258619 A1 * | 11/2005 | Zweideck | 280/647 |
| 2006/0226191 A1 * | 10/2006 | Williams | 224/409 |

FOREIGN PATENT DOCUMENTS

| | | |
|---|---|---|
| EP | 0 122 760 | 10/1984 |
| EP | 0 719 693 | 7/1996 |
| EP | 1 258 413 | 11/2002 |
| EP | 1 288 101 | 3/2003 |
| EP | 1 437 286 | 7/2004 |
| EP | 1 462 334 | 9/2004 |
| EP | 1 488 981 | 12/2004 |
| EP | 1 598 257 | 11/2005 |
| WO | WO 90/10567 | 9/1990 |

OTHER PUBLICATIONS

Product Literature from Chicco USA website for the Chicco C1 Stroller; www.chiccousa.com.

Product Literature from Inglesina website for the Inglesina Zippy Stroller; www.inglesina.com.

Product Literature from the Peg-Perego website for the Peg-Perego Pliko P3 Classico Stroller; http://usa.pegperego.it.

Partial European Search Report issued in corresponding European Application No. 08 16 5002 dated Oct. 13, 2009.

* cited by examiner

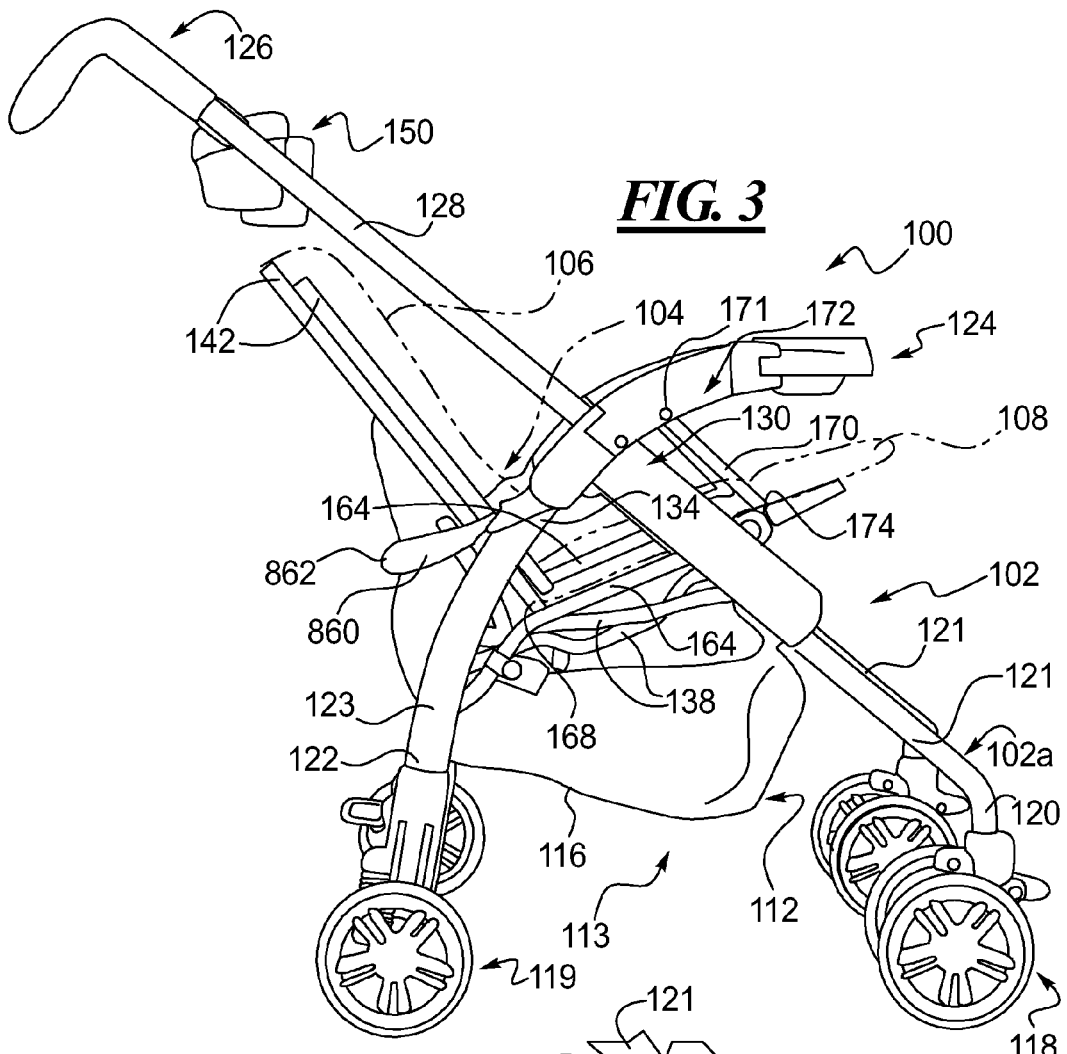
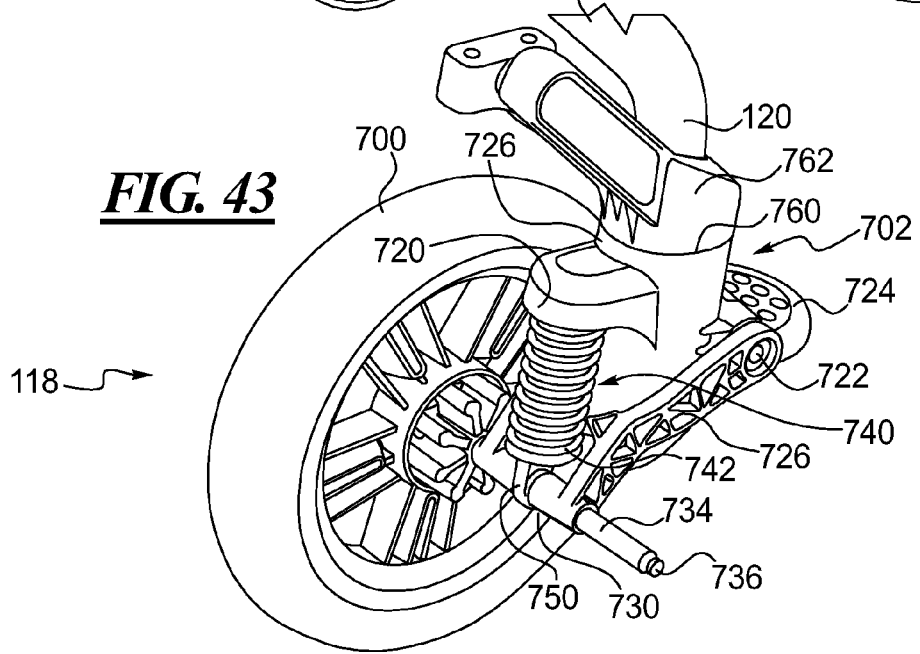

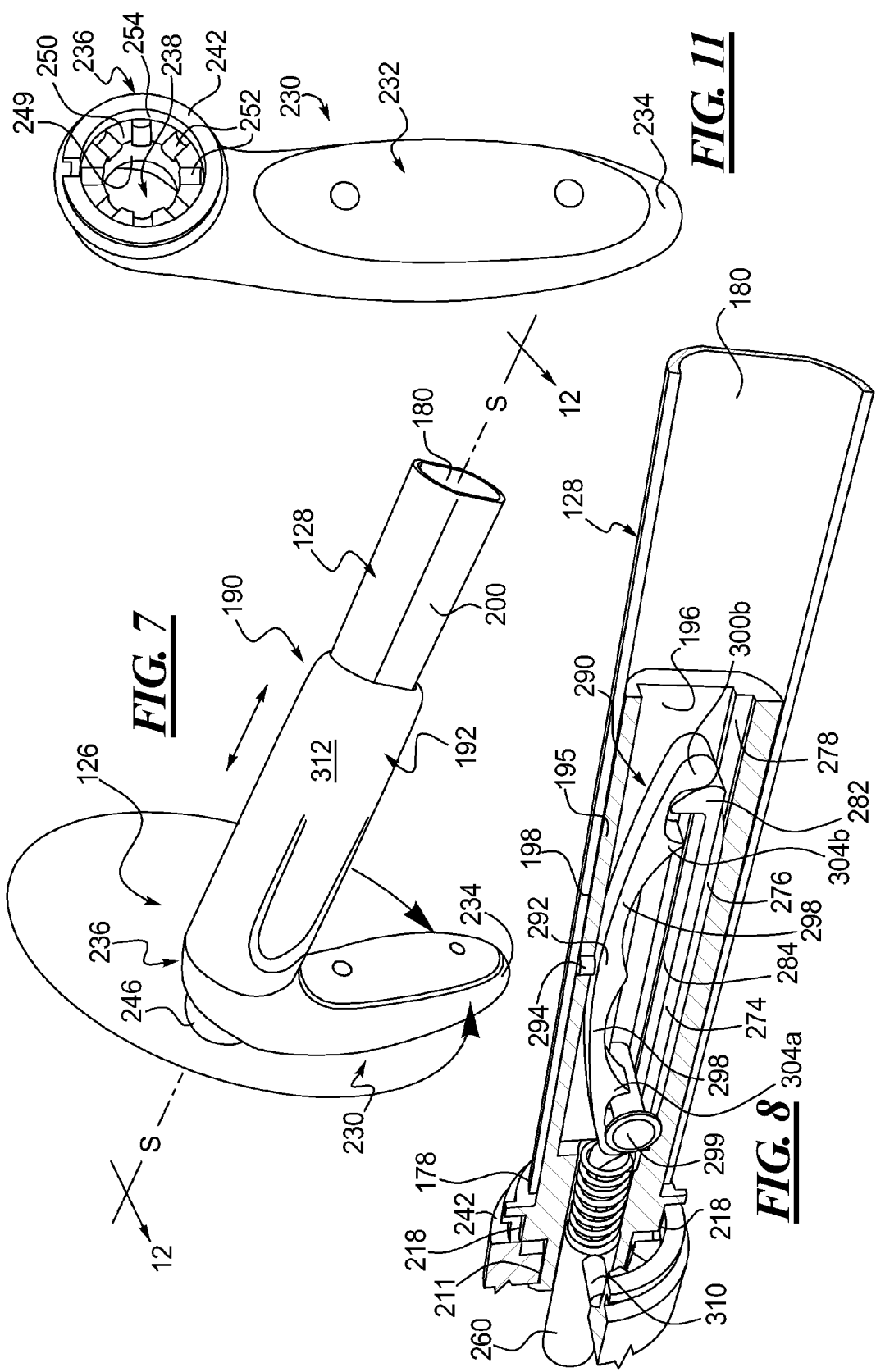

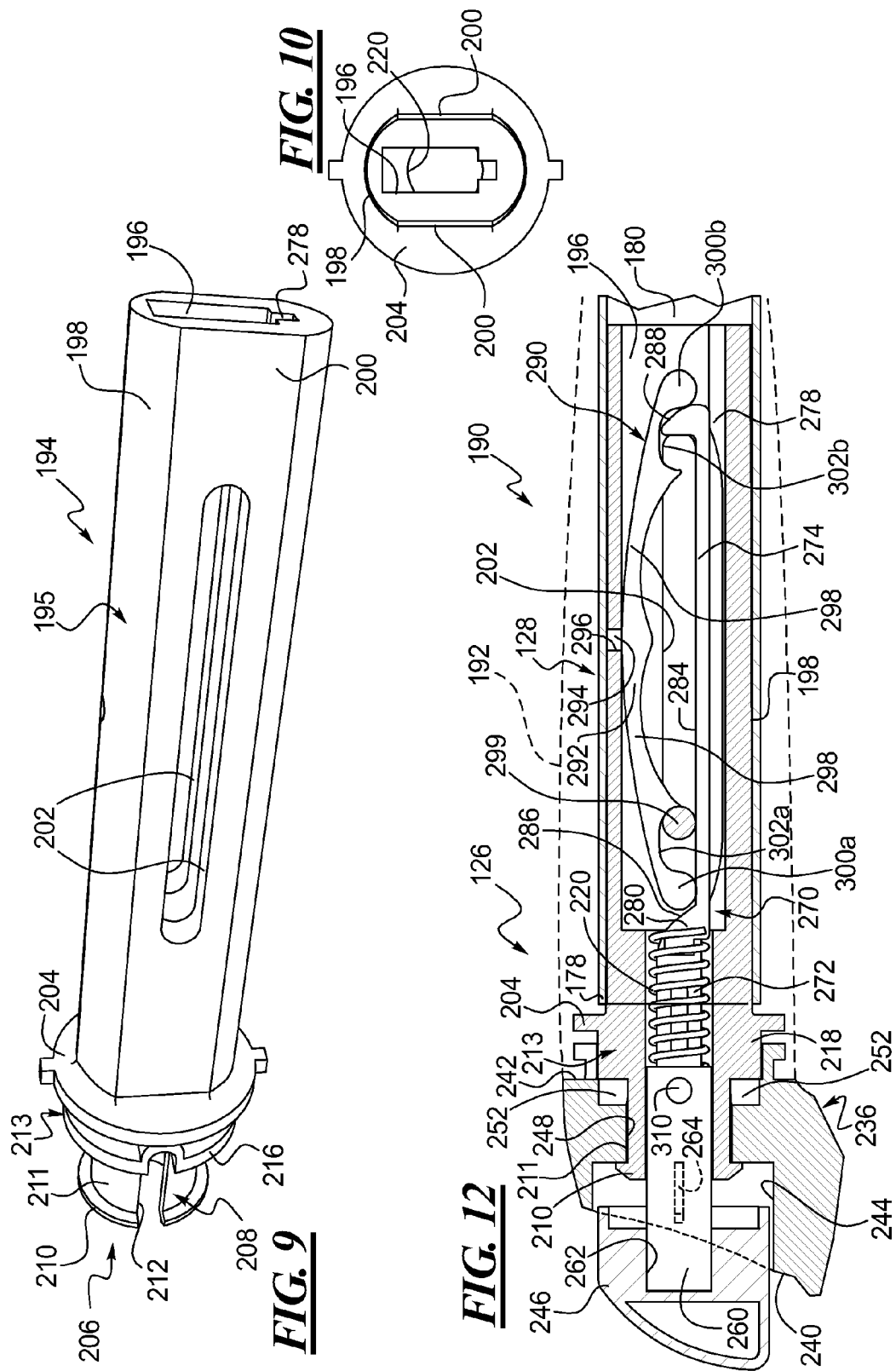

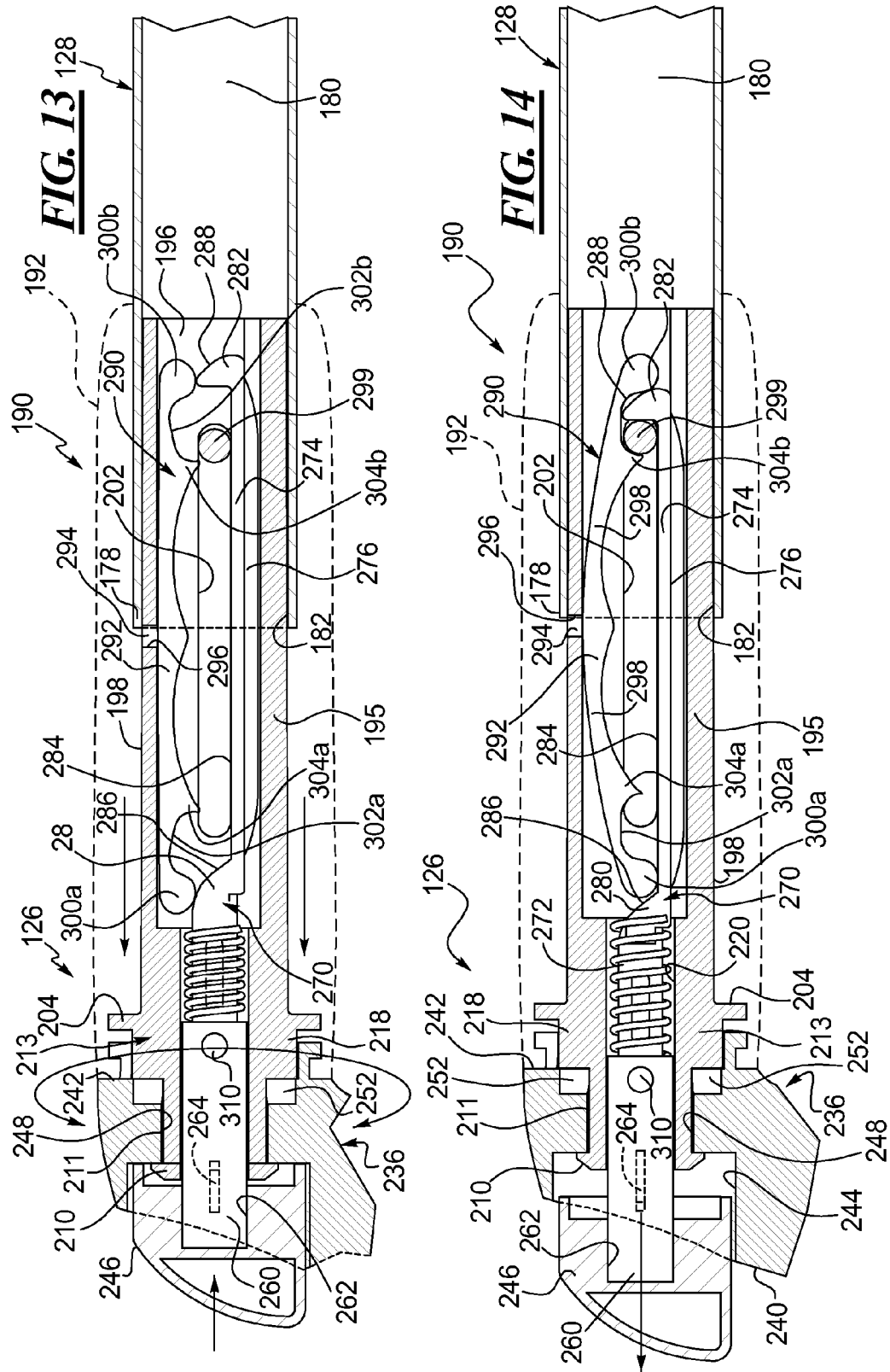

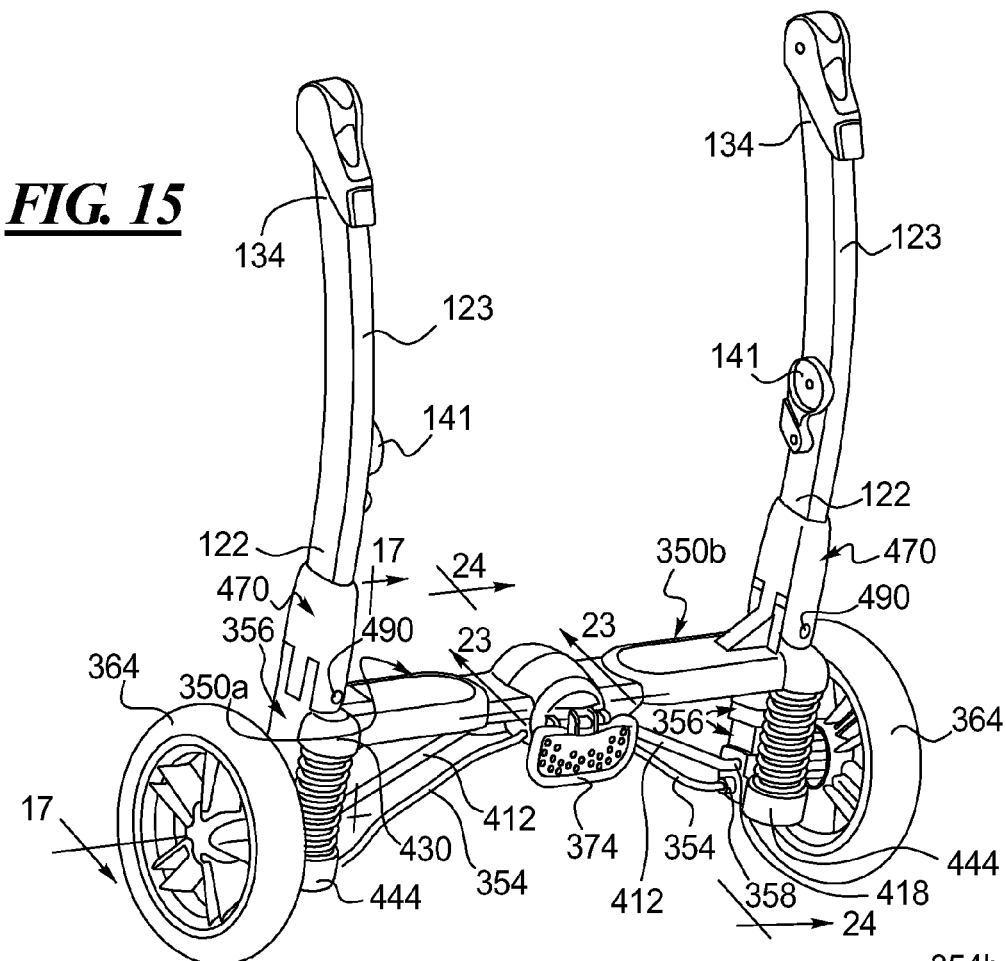
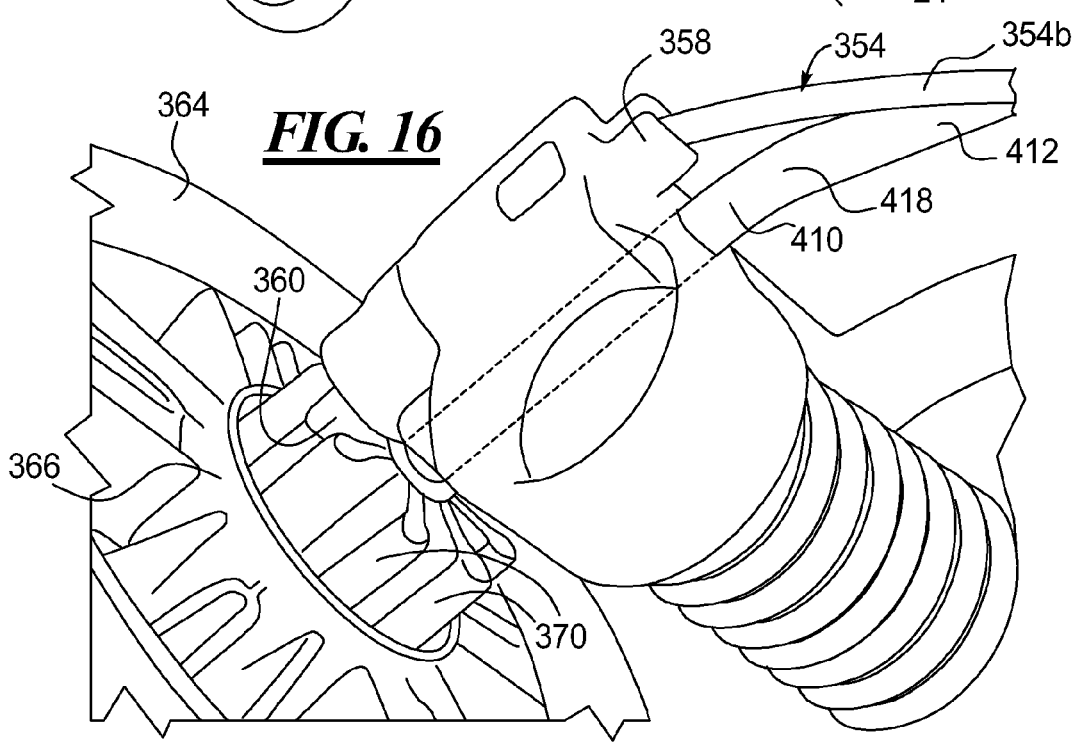

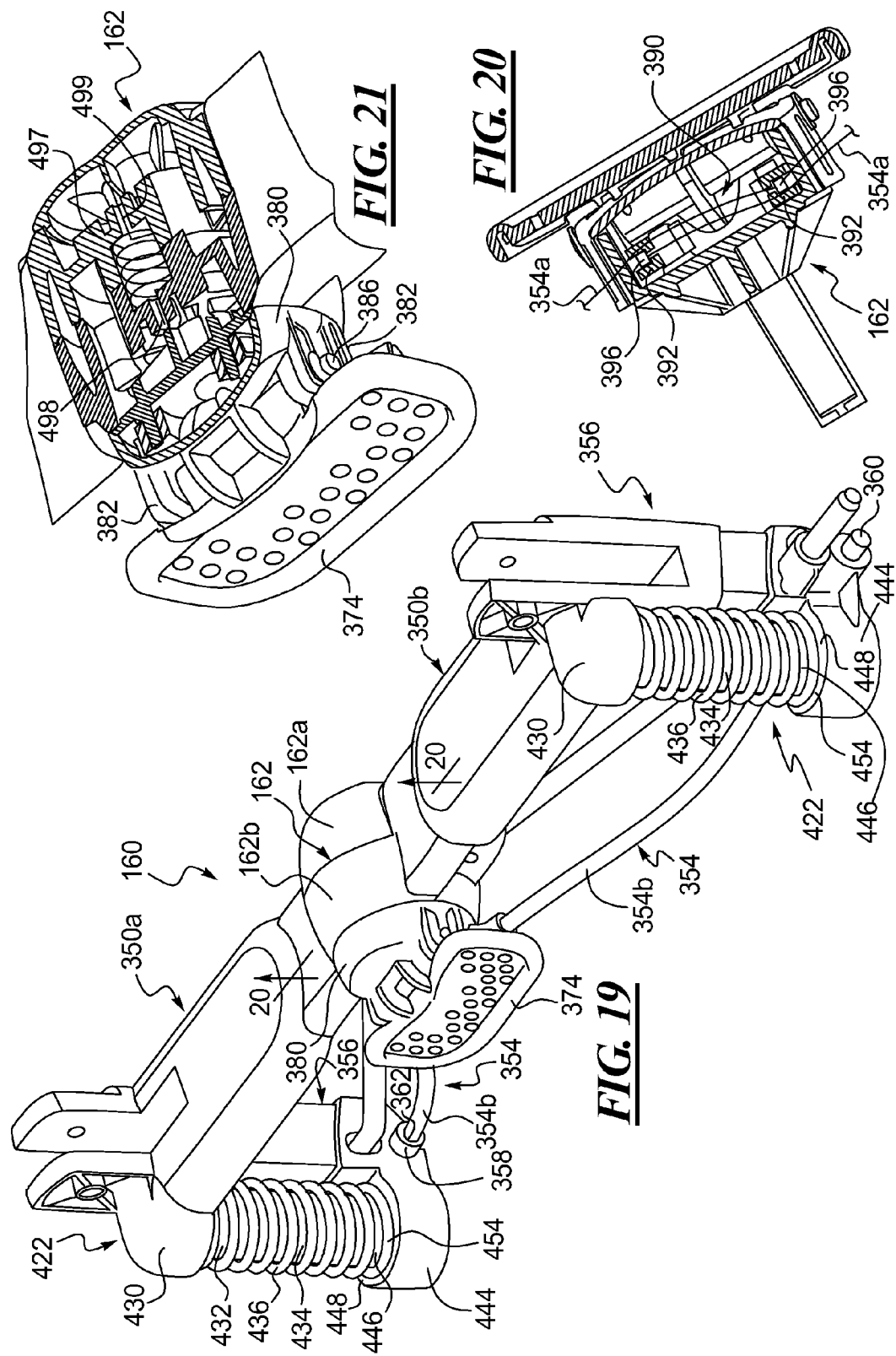

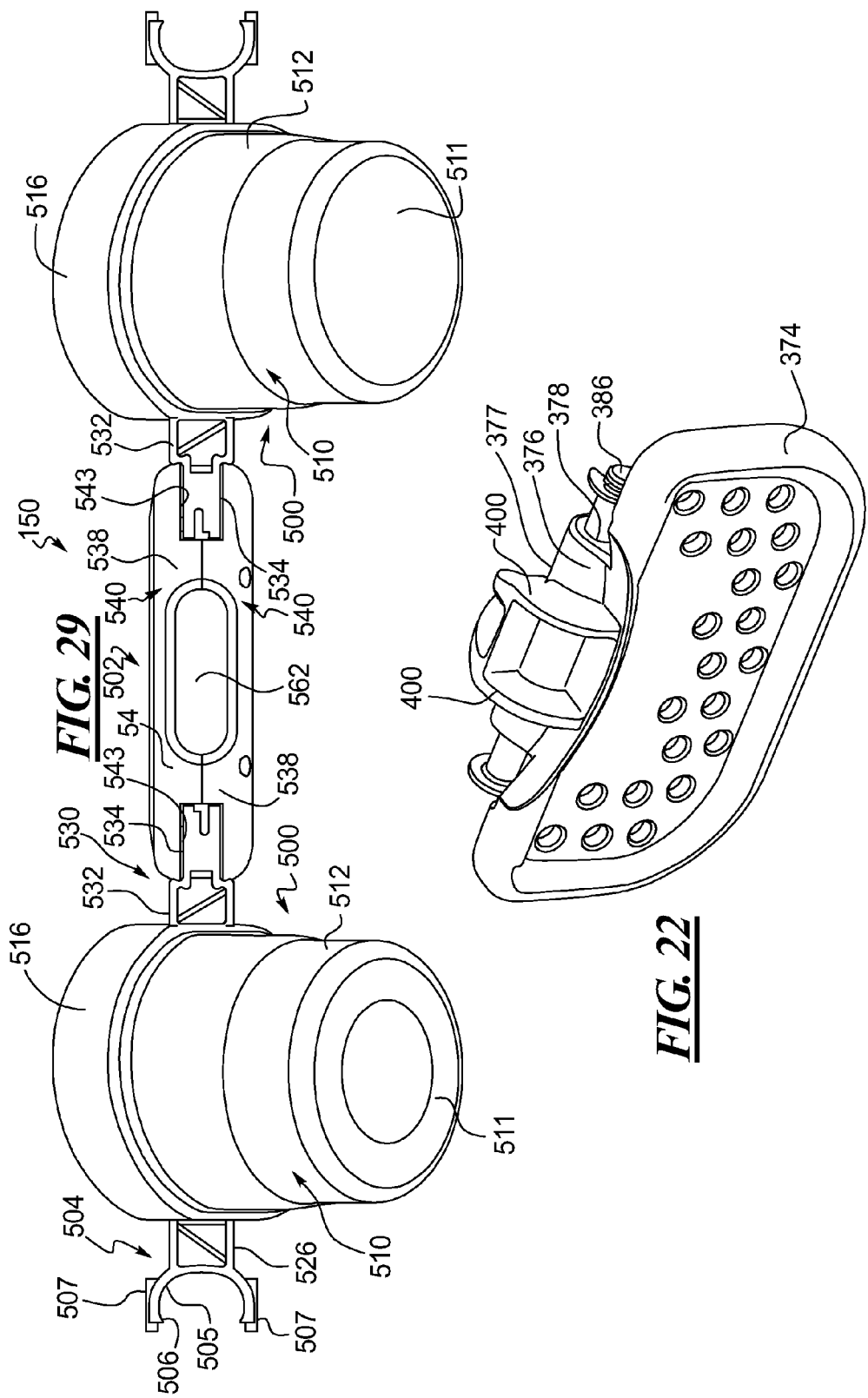

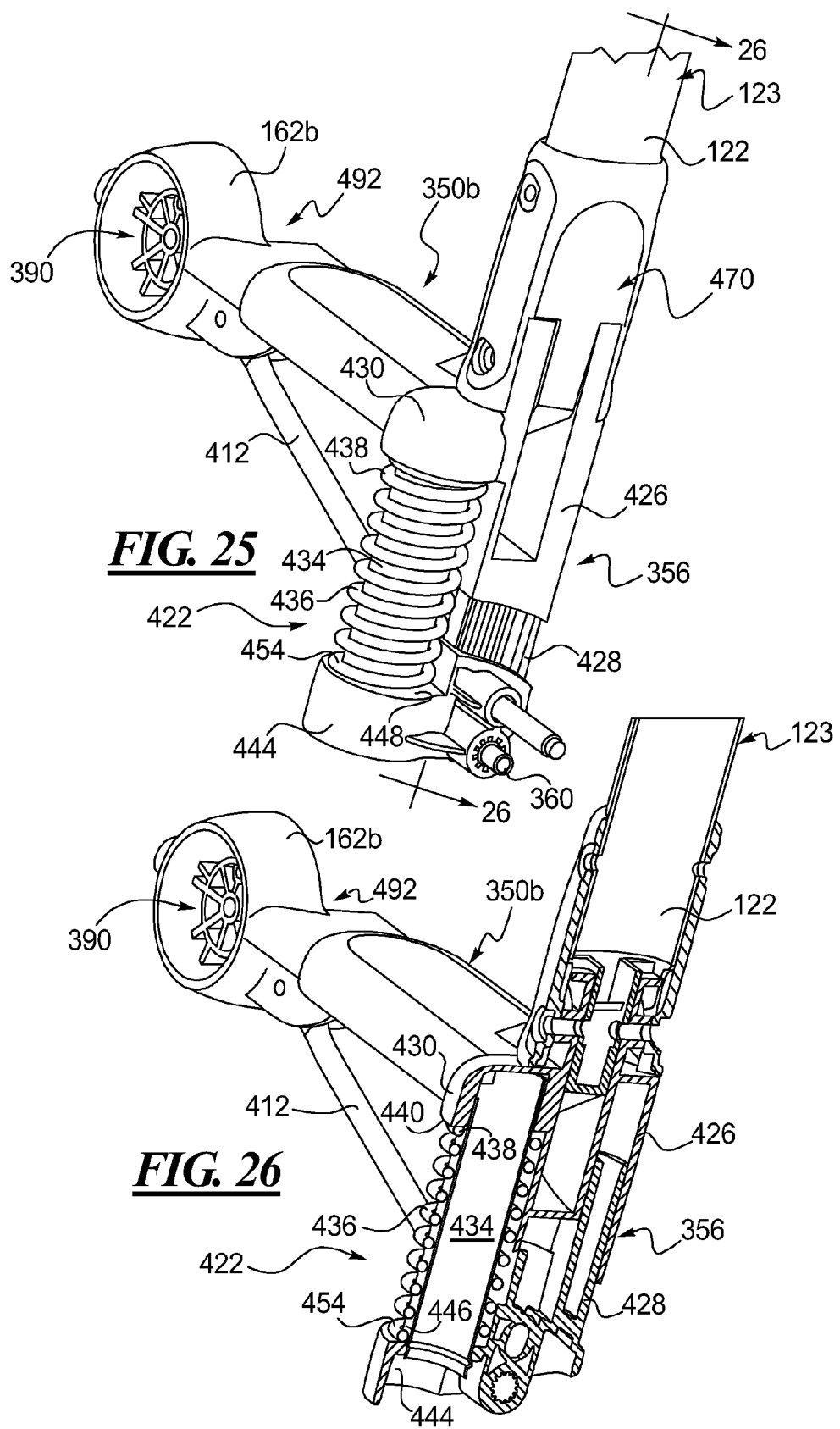

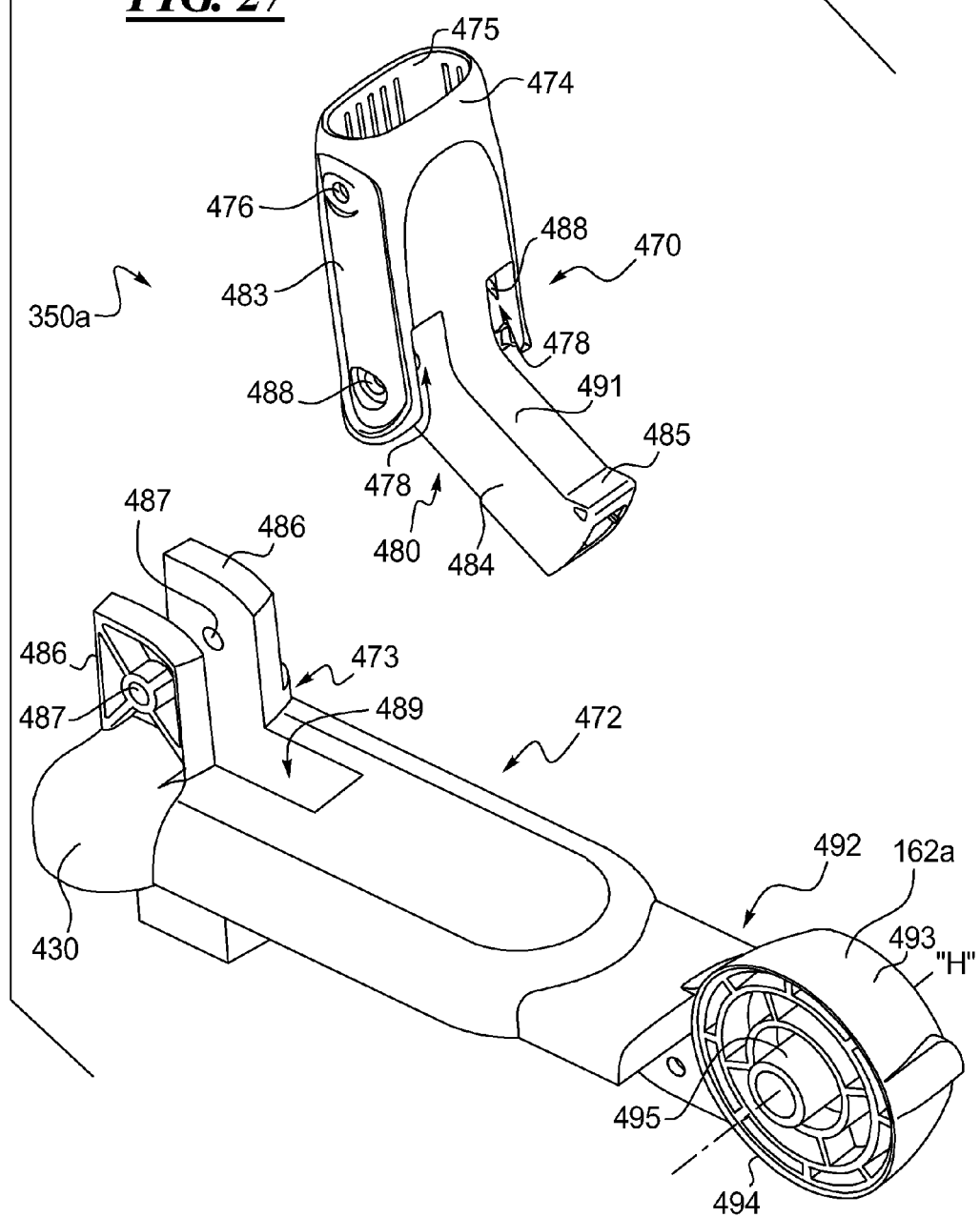

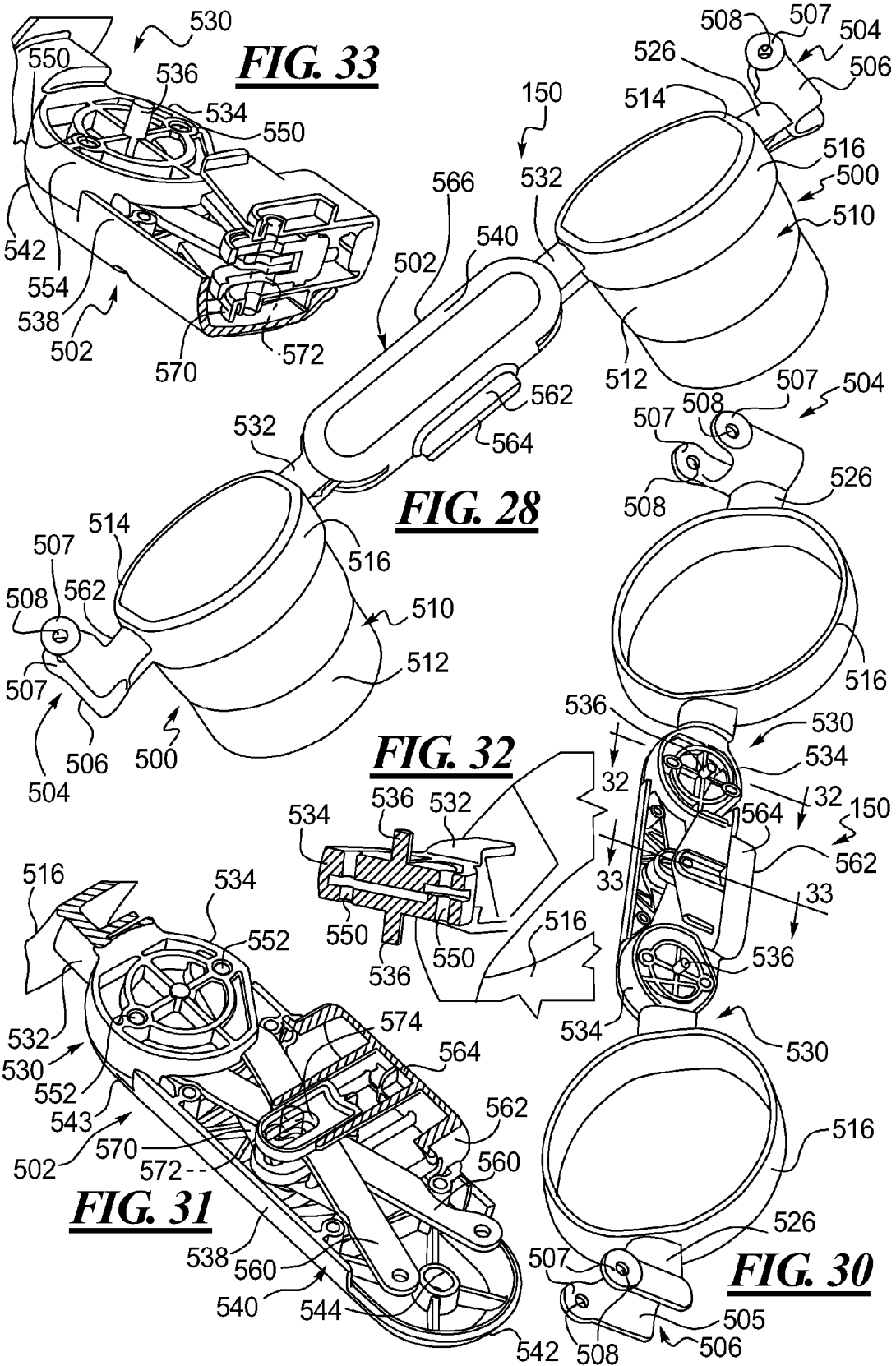

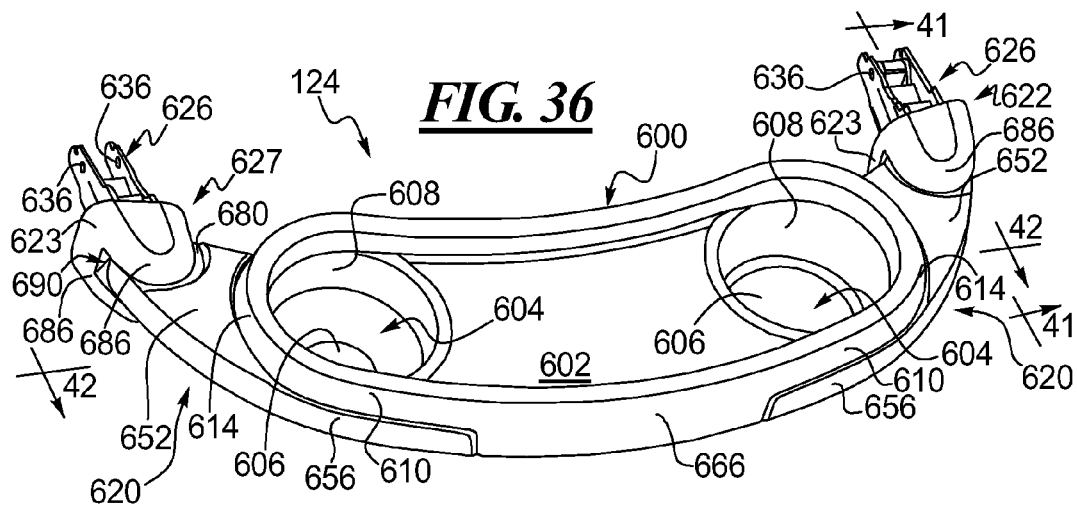
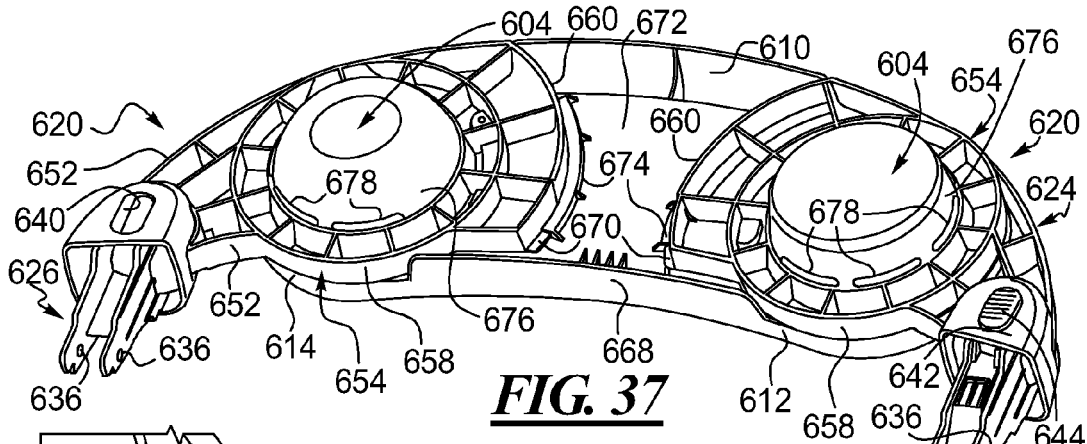
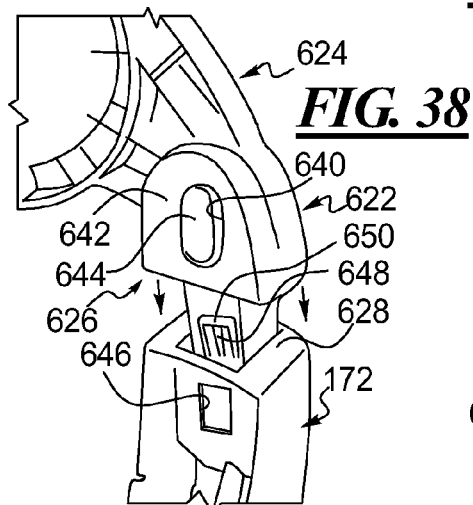
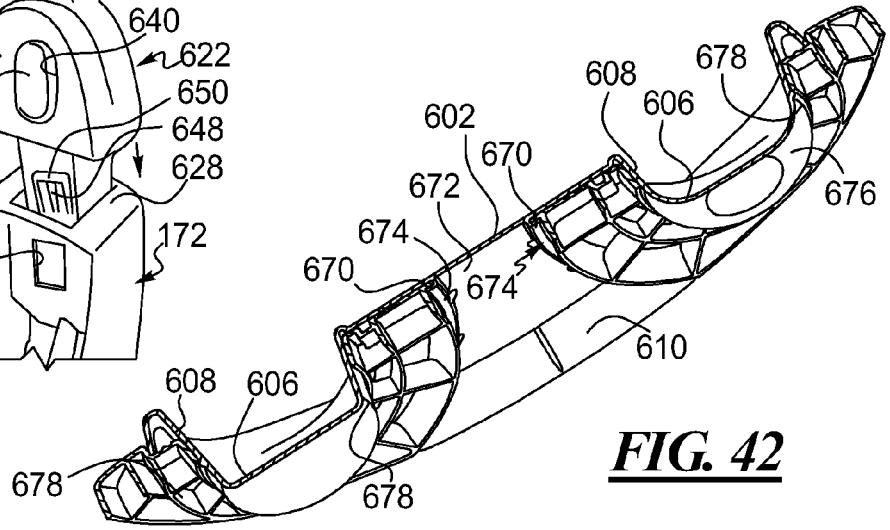

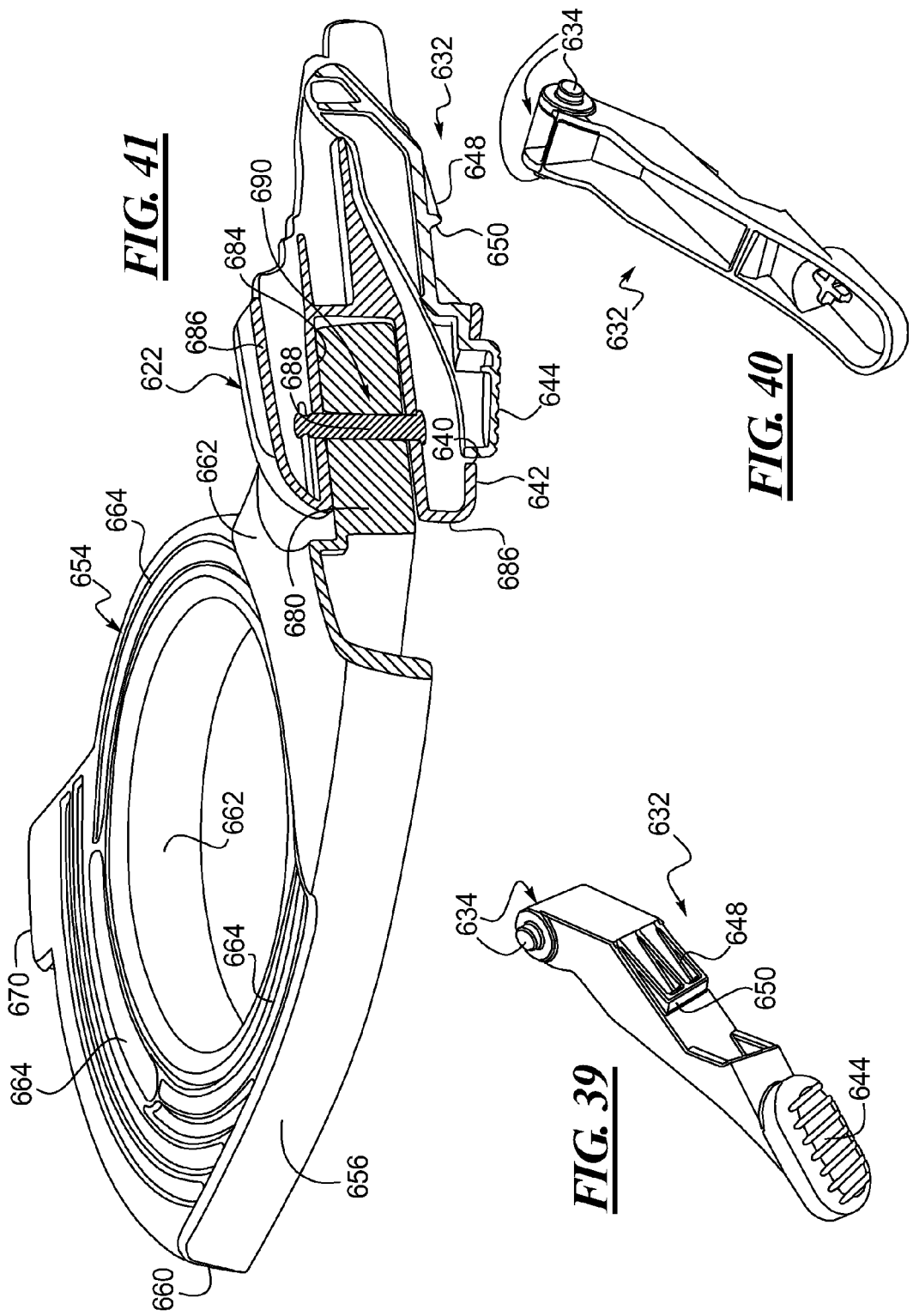

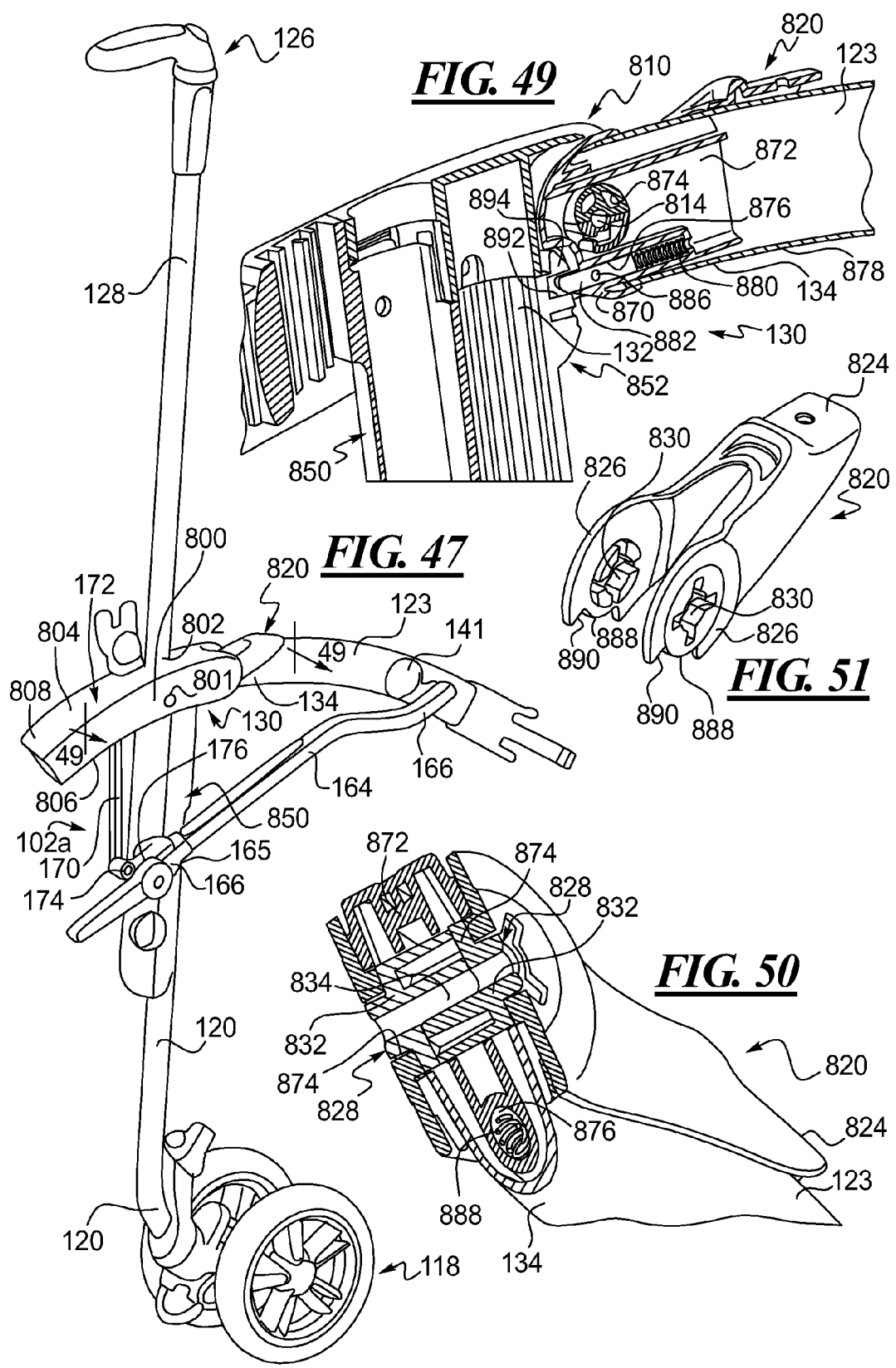

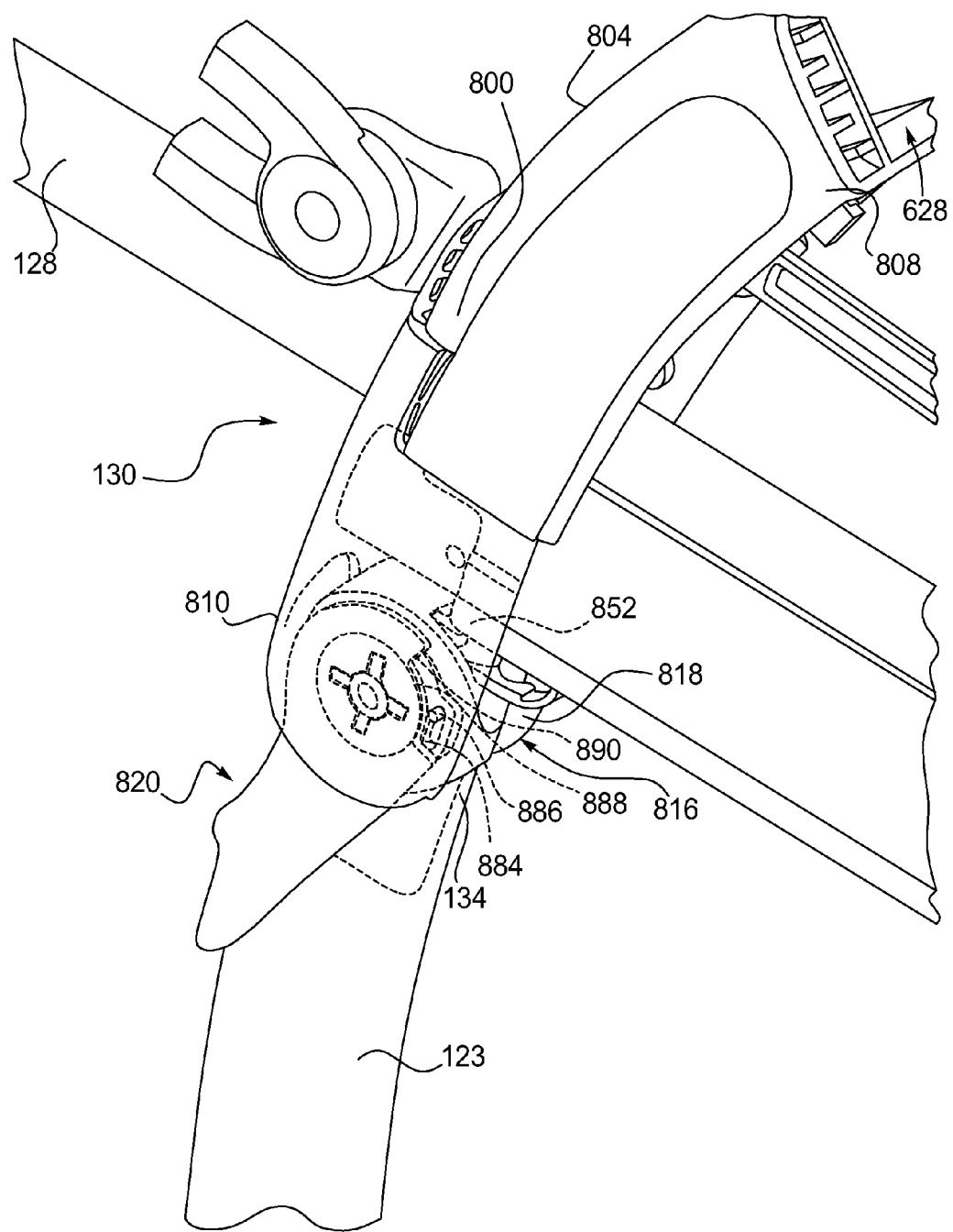

COLLAPSIBLE STROLLER

RELATED APPLICATION DATA

This patent is a Division of, and claims the priority benefit of, U.S. patent application Ser. No. 11/337,962, filed on Jan. 23, 2006, which claimed the priority benefit of U.S. provisional patent application Ser. No. 60/645,047, filed on Jan. 21, 2005. The entire disclosures of these prior applications are hereby incorporated by reference.

BACKGROUND OF THE INVENTION

1. Field of the Disclosure

The present invention is for a stroller, and more particularly to a collapsible stroller that can be reconfigured between a collapsed configuration when not in use and an in-use expanded configuration for use.

2. Description of Related Art

Collapsible strollers are known in the art. Many strollers fold in two-dimensions in that they can collapse vertically and horizontally forward and rearward. There are also strollers available that fold in three-dimensions. Such strollers also fold vertically and horizontally fore and aft, but additionally fold horizontally side-to-side. There are problems, design deficiencies, and limitations associated with both types of strollers.

A three-dimensional stroller typically has a scissor-like cross-brace structure extending between rear legs of the stroller for stability. The cross-brace structure typically includes at least two, and sometimes more, components connected to the rear legs and pivotally joined to one another between the rear legs to form an X-shaped structure. The structure collapses in a scissor-like fashion. These types of cross-brace structures inhibit access to the area beneath the seat of the stroller. The X-shaped brace reduces storage space beneath the seat, making it difficult for a user to fully utilize the storage space under the seat. Further, such a prohibitive cross-brace structure reduces the overall utility and functionality of the three-dimensional strollers.

A typical three-dimensional collapsible stroller requires a number of distinct user actions to facilitate reconfiguring the stroller from the set-up or expanded configuration to the collapsed configuration. A user typically must independently release one or two cross-braces supporting the stroller in the set-up configuration. The user then must also independently release two latches, one on each side of the stroller frame structure in order to facilitate horizontal and vertical collapsing. The result is that a user must coordinate three, and often four, different maneuvers in order to collapse their three-dimensional stroller.

Most strollers incorporate rear wheel brakes for safety purposes. Two-dimensional strollers are known that incorporate a solid cross-bar interconnecting the rear wheels on either side of the stroller. The opposed ends of the bar are known to incorporate devices that can either lock or release a brake at each rear wheel. The brakes can often be set or released using a single foot lever or paddle provided on the bar. Three-dimensionally collapsible strollers do not incorporate a solid cross-bar extending between the rear wheels of the stroller. Otherwise, the stroller could not collapse from side-to-side. A typical three-dimensionally collapsible stroller instead incorporates the use of two separate brake levers, one on each rear wheel, which can be actuated by separate split-bar brake links or linear actuator cables to engage and disengage the brakes at each wheel.

Strollers currently available on the market employ a variety of different types of handles or grips that are held by a user to push and manipulate the stroller. Cross-bar type handles are well known. Umbrella-type single grip handles are also known. Many strollers offer no handle position adjustment. A number of strollers do offer handle adjustment but most of these offer adjustment in only a single direction, whether it be tilt, fore and aft, or rotational adjustment (for umbrella-type handles). Where a stroller does offer multi-direction handle adjustment, adjustment is typically performed utilizing a different actuation sequence for each adjustment direction.

A typical three-dimensionally collapsible stroller does not offer integrated cup holders for an adult standing behind and pushing the stroller. These types of stroller may offer an add-on cup holder that must be removed when the stroller is collapsed and that must be clipped, snapped, or otherwise attached to the stroller when desired. This is because cup holders are usually integrated in a solid tray spanning between the rear legs near the handle of a two-dimensional collapsible stroller. In a three-dimensionally collapsible stroller, no such rigid tray can be incorporated unless it can be entirely removed when the stroller is to be collapsed. Any structure extending between the two sides of a three-dimensionally collapsible stroller must be capable of collapsing.

When a stroller is collapsed, a user often wishes to either stand the stroller up on one end either to limit the amount of floor space the stroller takes up when not in use, or to stow the stroller out of the way in a small space behind other objects. Many strollers do not easily stand on end when in a collapsed configuration. This is because parts of the collapsed stroller on either end do not properly align in order to provide a level, stable base to support the stroller in a standing orientation. Some strollers when collapsed are known to be able to stand on one set of wheels and on a front edge of the child's tray. Over time, the tray can become scuffed and damaged when used in such a manner. The scuffs and scratches can collect dirt, which can be unsanitary for a child using the tray, and can simply become visually unpleasant in appearance.

Strollers that compact in three-dimensions typically do not come in a full-size or full-featured stroller product. This is because the strength requirements and complexity necessary for such a stroller will limit the stability of the frame structure and the overall useful characteristics and functionality of its features, including basket access as described above. Another problem with strollers that fold in three-dimensions is that they typically have a large vertical dimension when folded. If such a stroller compacts vertically, it typically would have a large dimension in one of the other folded directions. One problem with conventional strollers that fold in three-dimensions is that the rear wheels are typically offered in four wheel sets incorporating two rear wheels on each side of the stroller. The rear wheels typically do not fold or reposition when the stroller is collapsed. Thus, the stroller height when folded does not compact in this area of the stroller.

BRIEF DESCRIPTION OF THE DRAWINGS

Objects, features, and advantages of the various aspects and disclosed examples of the present invention will become apparent upon reading the following description in conjunction with the drawing figures, in which:

FIG. 3 is a side view of the stroller of FIG. 1.

FIG. 7 is a perspective view of a handle assembly and part of the frame structure of the stroller of FIG. 1.

FIG. 8 is a partial cross section and partial cut-away view of the handle assembly of FIG. 7.

FIG. 9 is a perspective view of a stem core of the handle of FIG. 7.

FIG. 10 is an end view of the stem core of FIG. 9.

FIG. 11 is a perspective view of a grip body of the handle of FIG. 7.

FIG. 12 is a cross section of the handle assembly and taken along line 12-12 of FIG. 7.

FIG. 13 is the cross section of FIG. 12 but with the handle actuator depressed.

FIG. 14 is the cross section of FIG. 12 but with the handle extended on the frame structure to a different position.

FIG. 15 is a perspective view of a rear wheel and rear leg subassembly of the stroller of FIG. 1.

FIG. 16 is an enlarged view from underneath one of the rear wheel assemblies shown in FIG. 15.

FIG. 19 is a portion of the subassembly of FIG. 15 but with the rear legs and wheels removed.

FIG. 20 is a cross section of the rear wheel cross-brace hub and taken along line 20-20 of FIG. 19.

FIG. 21 is a cut away perspective view of the rear wheel cross-brace hub of FIG. 19.

FIG. 22 is a perspective view of the foot paddle of the brake system of FIG. 19.

FIG. 25 is a view of one half of the cross-brace assembly and rear wheel suspension of the subassembly of FIG. 15.

FIG. 26 is a cross section of the rear wheel suspension and taken along line 26-26 of FIG. 25.

FIG. 27 is an exploded perspective view of one of the cross-brace sections of the subassembly of FIG. 15.

FIGS. 28 and 29 are perspective view from different orientations of the upper cross-brace of the stroller of FIG. 1.

FIG. 30 is a perspective view of the cross-brace of FIG. 28 with parts removed for clearer understanding of internal components.

FIG. 31 is a perspective view of the handle assembly of the cross-brace of FIG. 28 with parts removed for clearer understanding of the internal components.

FIG. 32 is a cross section of one cup holder ring and puck and taken along line 32-32 of FIG. 30.

FIG. 33 is a cross-section of the handle assembly and taken along line 33-33 of FIG. 30.

FIG. 36 is a perspective top view of the child's tray of the stroller of FIG. 1.

FIG. 37 is a perspective bottom view of the child's tray of FIG. 36.

FIG. 38 is an enlarged view of one end of the child's tray of FIG. 36 and being inserted into a part of the stroller of FIG. 1.

FIGS. 39 and 40 are perspective views of a finger of a latching mechanism of the child's tray of FIG. 36.

FIG. 41 is a cross section of one support arm of the child's tray and taken along line 41-41 of FIG. 36.

FIG. 42 is a cross section of the child's tray and taken along line 42-32 of FIG. 36.

FIG. 43 is a perspective view of one front wheel and suspension assembly of the stroller of FIG. 1.

FIG. 47 is a perspective view of a front wheel assembly, a rear leg, and a handle portion of the frame assembly of the stroller of FIG. 1.

FIG. 48 is a perspective view of a joint assembly of one side of the frame of the stroller of FIG. 1.

FIG. 49 is a cross section of part of the joint assembly and taken along line 49-49 of FIG. 47.

FIG. 50 is a cross section of part of the joint assembly and taken along line 50-50 of FIG. 47.

FIG. 51 is a perspective view of a latch lever of the joint assembly of stroller frame portion of FIGS. 47 and 48.

DETAILED DESCRIPTION OF THE DISCLOSURE

Various features of the stroller examples described herein solve or improve upon one or more of the above-noted problems, deficiencies, and limitations of prior art strollers. In one example, a disclosed stroller that folds in three dimensions has one brake actuator that can be manipulated to lock and release the brake mechanisms on both rear wheel assemblies. In one example, a disclosed stroller can be collapsed and stood on one end both while providing a stable base for standing, and while not causing damage to visible, ordinarily useful portions of the stroller structure. In another example, a disclosed stroller includes a handle that can be adjusted in more than one adjustment direction or mode using the same adjustment actuator. In yet another example, a disclosed stroller is collapsible in three dimensions and yet provides storage space beneath the seat of the stroller with clear, unencumbered access to the storage space. In a further example, a disclosed stroller can be manipulated from the in-use or expanded configuration to the collapsed configuration using only two, single hand maneuvers. In a still further example, a disclosed stroller is collapsible in a side-to-side or width direction and yet integrates one or more adult-use cup holders into a cross-brace of the frame structure. In a still further example, a disclosed stroller has front and rear suspension components integrated into multi-function front and rear wheel assemblies. These and other features can be achieved in a stroller constructed in accordance with the teachings of the present invention.

Figure 1:
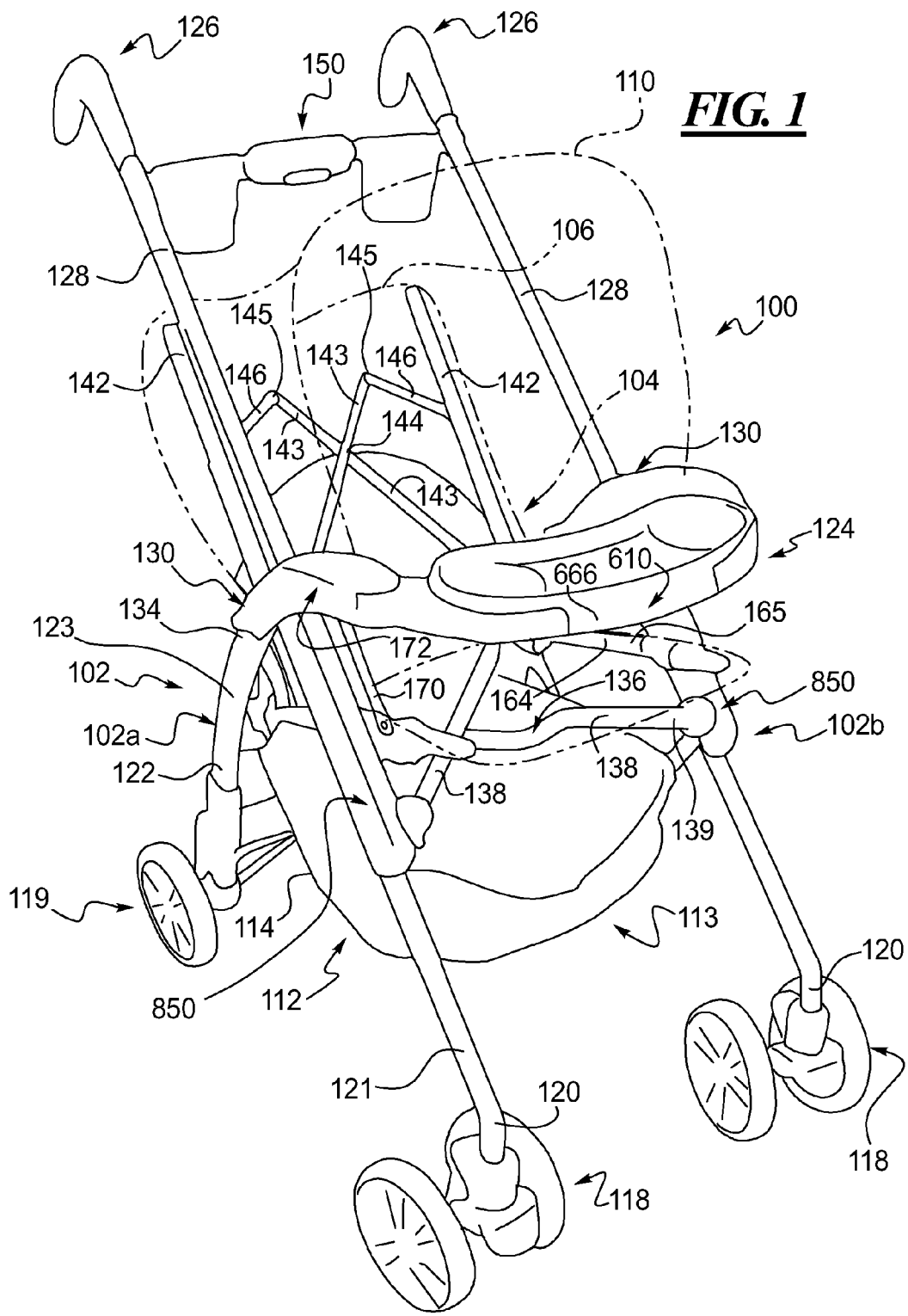
FIG. 1 is a front perspective view of a stroller in an in-use configuration and constructed in accordance with the teachings of the present invention.
Figure 2:
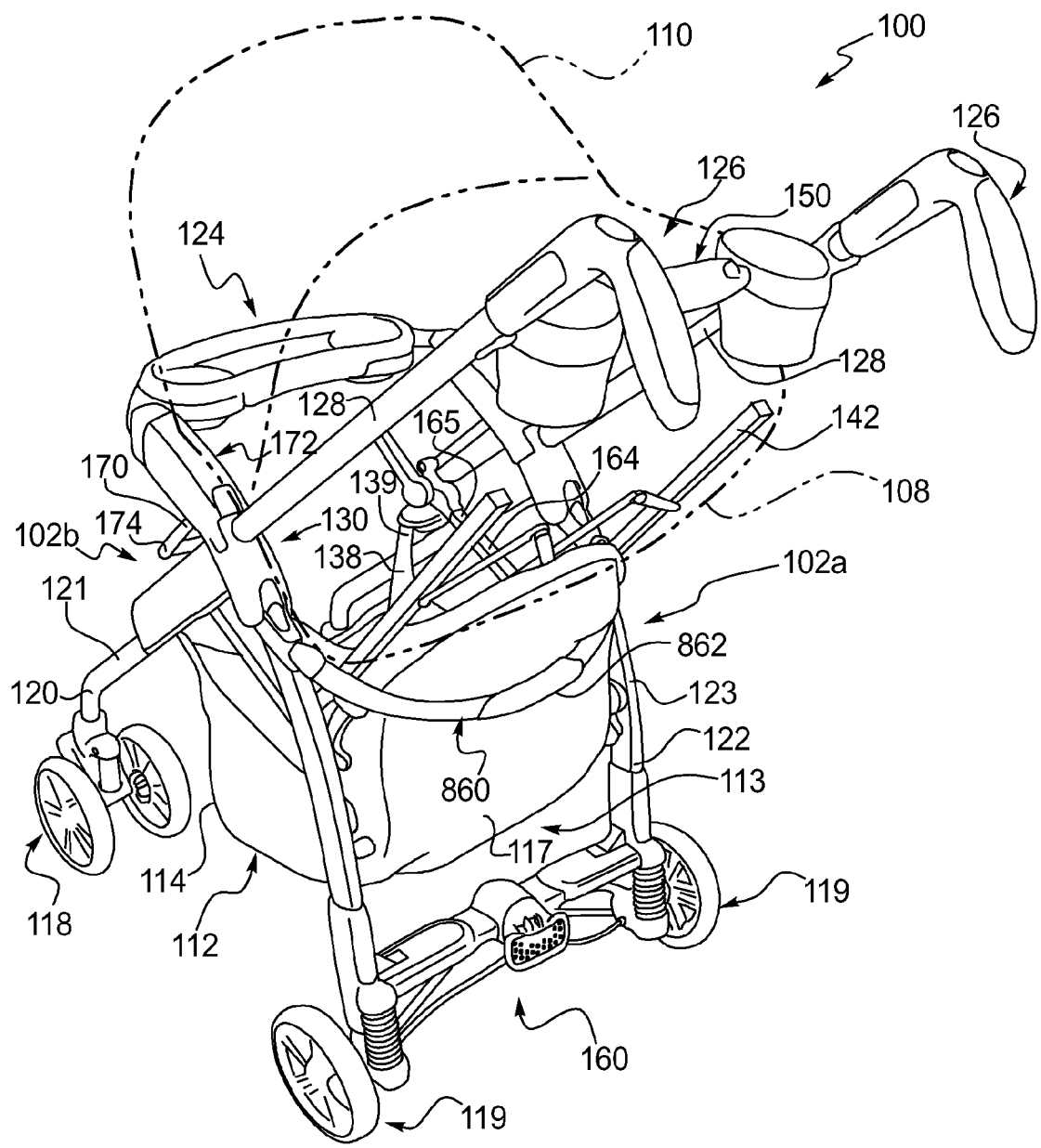
FIG. 2 is a rear perspective view of the stroller of FIG. 1.

Turning now to the drawings, FIGS. 1 and 2 are perspective views of one example of a stroller 100 constructed in accordance with the teachings of the present invention. The soft goods are only shown in phantom herein, other than a loose, under-seat storage basket or pouch. The soft goods are removed in order to better illustrate all of the basic structural and functional components of the stroller. FIG. 3 is a side view of the stroller shown in FIGS. 1 and 2, all in an in-use expanded configuration. The stroller 100 generally has a frame assembly 102 with a pair of opposed and spaced apart frame sides 102a and 102b. A seat 104 is supported above a ground surface between the frame sides. The seat 104 in this example is formed of soft goods including padding and fabric material supported by various portions of the frame assembly 102. The typical seat 104 has a seat back 106 and a seat bottom 108. A bonnet or cover 110 is shown in phantom in an extended position covering a portion of the seat 104. The bonnet 110 can be optional and can be removable or even reconfigurable to a collapsed condition against the seat back or a portion of the frame assembly, as is known.

The stroller 100 also incorporates one of many possible examples of a storage basket 112 or fabric pouch beneath the seat bottom 108. The storage basket 112 in this example is positioned in a storage area 113 beneath the seat and is highly space efficient. The disclosed basket 112 has a soft fabric perimeter sidewall 114 extending upward from a bottom 116. The basket has a rear panel 117 that can be selectively raised or lowered and fastened or unfastened to portions of the stroller. As will be evident to those having ordinary skill in the art, the configuration of the storage basket 112 can vary considerably and yet fall within the spirit and scope of the present invention. The basket can be a simple droopy pouch as shown in FIGS. 1-3. Alternatively, the basket can include a rigid horizontal storage surface or a semi-rigid article support surface positioned well below the seat bottom 108. Such a basket can also include upstanding sidewalls including a rear wall. The rear wall of such a basket can also be of a type that can be raised or lowered to either assist in retaining objects in the storage area or provide clear access to the storage area to insert or remove large objects as needed.

Figure 4:
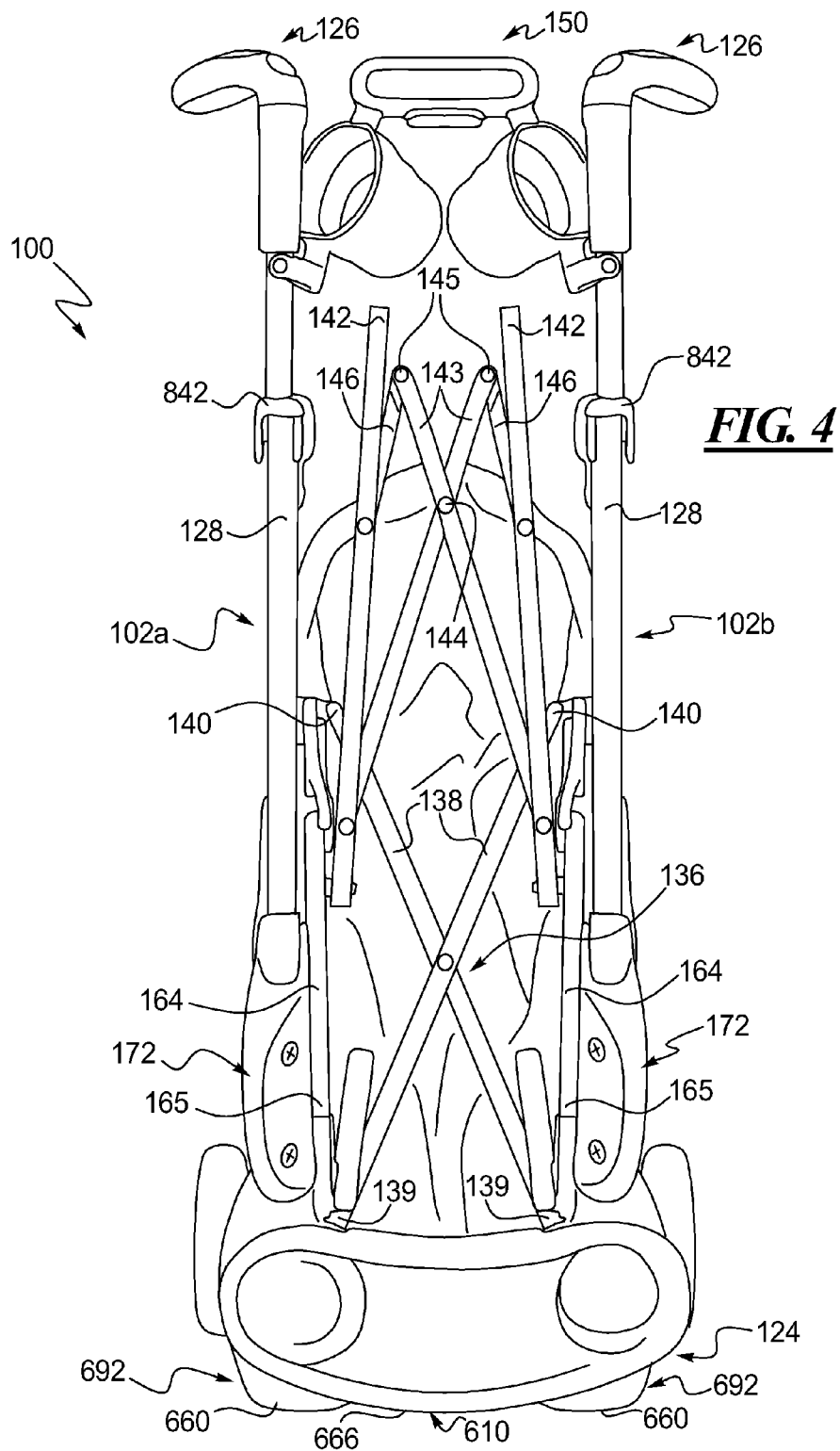
FIG. 4 is a front view of the stroller of FIG. 1 in a collapsed configuration.
Figure 5:
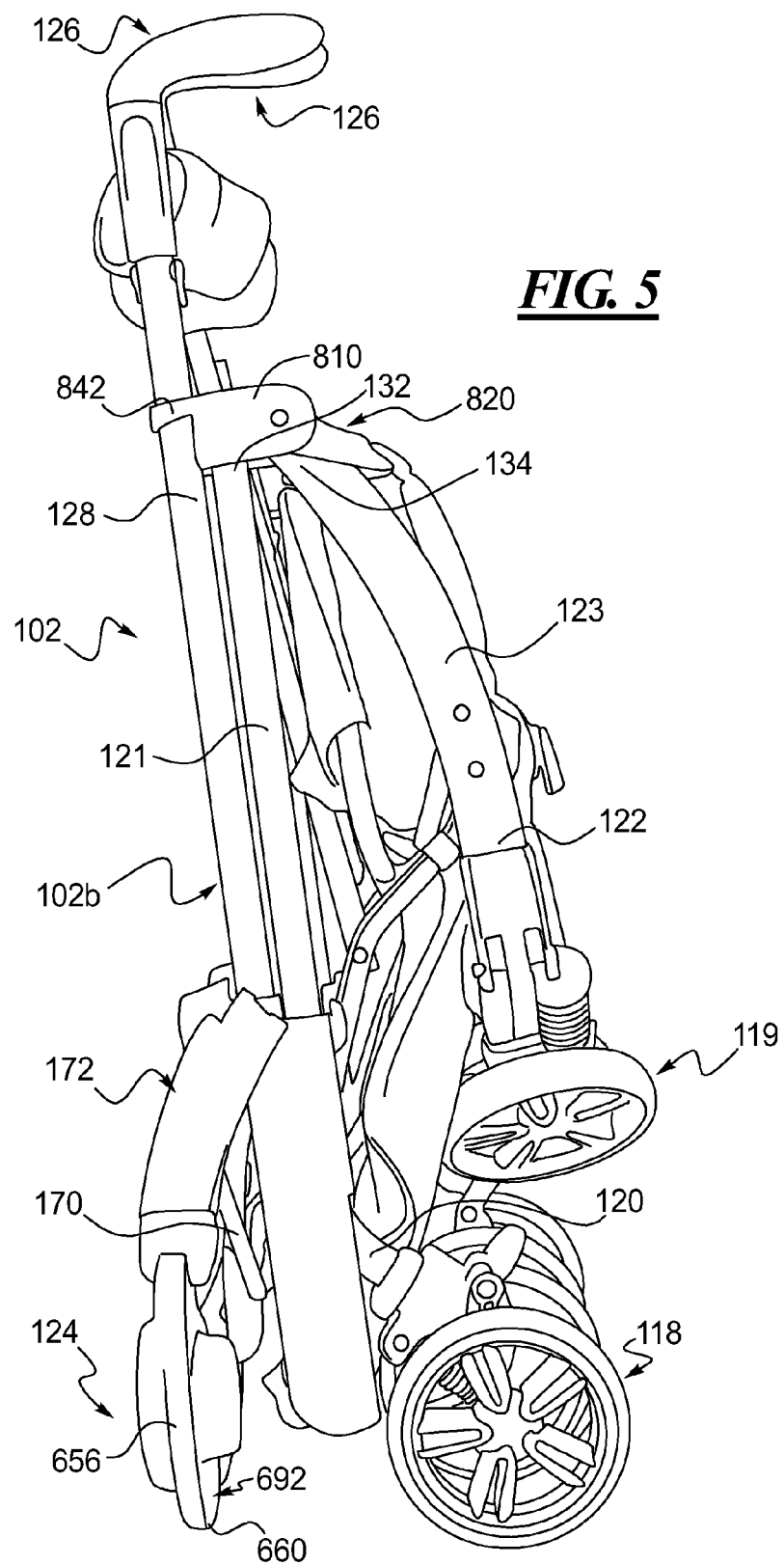
FIG. 5 is a side view of the collapsed stroller of FIG. 4.
Figure 6:
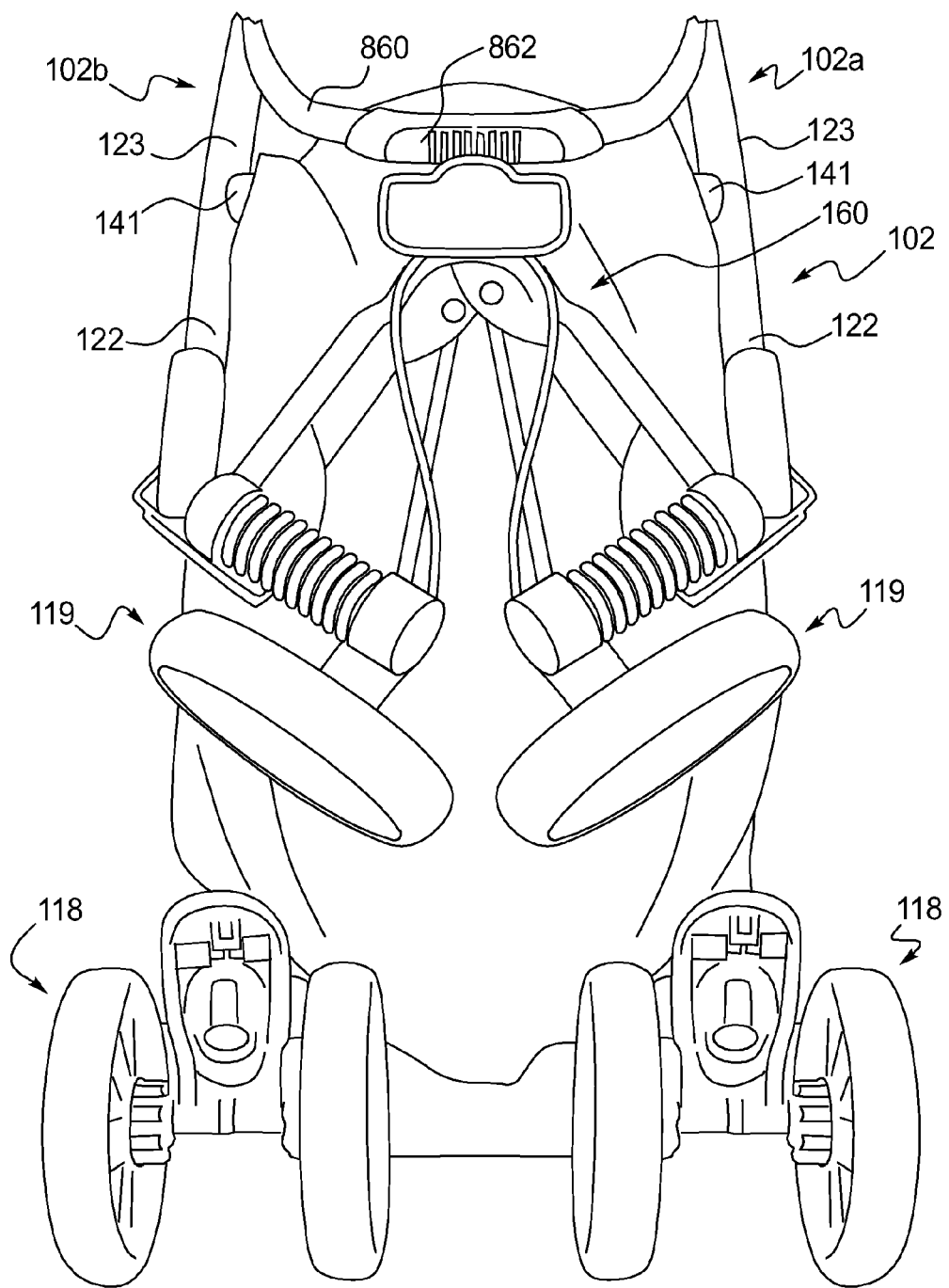
FIG. 6 is a rear view of the collapsed stroller of FIG. 4.

In this disclosed example, the frame assembly 102 incorporates multiple parts that are movably interconnected with one another. The parts can be arranged and retained in the in-use or expanded configuration as depicted in FIGS. 1-3. As shown in FIGS. 4-6, the frame assembly 102 can be reconfigured and folded to a collapsed condition for stowing or storage. In the in-use configuration of FIGS. 1-3, the stroller 100 and its frame assembly 102 are supported by a pair of front wheel assemblies 118 and a pair of rear wheel assemblies 119 in this example.

The remaining major parts of the overall structure of the frame assembly 102 are described with reference to FIGS. 1-6. The frame sides 102a and 102b are interconnected by a plurality of transversely oriented structures. The frame sides in this example are oriented generally vertically when viewed from the front or back and when in the in-use configuration. In this example, each frame side 102a and 102b is essentially identical.

The frame sides 102a and 102b have an overall X-shaped configuration when viewed from the side. The frame 102 is supported by a pair of front wheel assemblies 118 and a pair of rear wheel assemblies 119. Each front wheel assembly 118 is carried on a lower end 120 of a front leg 121 and each rear wheel assembly 119 is carried on a lower end 122 of a rear leg 123. The front legs 121 extend upward and rearward from the respective front wheel assemblies. The rear legs 123 extend upward and forward in this example from the respective rear wheel assemblies 119.

The stroller 100 in this example also has a child's or occupant's tray 124 that extends across the frame assembly 102 above the seat 108 and forward of the seat back 106. The tray 124 can be configured to provide a surface or surfaces on which a child can place various types of objects. In this example, the tray 124 traverses the stroller between the front legs 121. The stroller 100 in this example also has a pair of "umbrella" type handles 126. A user will typically grasp the handles, one in each hand, in order to push, pull, and otherwise manipulate the stroller during normal use. Each handle 126 extends rearward from a rear frame extension 12.8, one on each frame side 102a and 102b. A joint structure 130 on each side of the stroller 100 joins and links the rear leg 123, front leg 121, and rear frame extension 128 of each frame side 102a and 102b. The rear frame extensions 128 extend rearward and upward from the joint structures 130 on the frame sides. An upper end 132 of the front leg 121 and an upper end 134 of the rear leg 123 extend up to the joint structures 130 on each frame side 102a and 102b in the disclosed stroller.

A number of linking and traversing structures connect or support various parts of the stroller. Many of these parts provide stability and rigidity to the overall stroller frame assembly, particularly during normal use when in the in-use configuration. The child's tray 124 can be considered one of the traversing structures because the tray will add stability to the overall stroller structure when fully installed and seated as described below. Another traversing structure is a seat bottom cross-member 136 as shown in FIGS. 1 and 3. The cross-member 136 is an X-shaped structure with two links 138 pivotally joined at their intersection. Front ends 139 of the cross-member links 138 are pivotally coupled to the joint assemblies 130 at the front legs 121 on each side of the stroller. Rear ends 140 of the cross-member links 138 are pivotally coupled to connectors 141 on the rear legs 123. The cross-member 136 can fold or expand in a scissor-like manner to accommodate the stroller configuration.

A further traversing structure supports the seat back 106 and can also collapse and expand as needed. The seat back is supported by a pair of seat risers 142, one each pivotally linked at their respective bottom ends to a part of each frame side 102a and 102b. The seat risers extend upward near but positioned behind and below the rear frame extensions 128. The risers 142 are linked to one another by a four link structure. Two lengthier links 143 pivotally connect to a respective one of the risers 142, extend upward toward the opposite riser, and intersect one another at a pivot joint 144 between the risers. The upper end of each link 143 is pivotally connected at a second pivot 145 to a shorter link 146. Each shorter link then angles downward and pivotally connects to the adjacent riser 142. The link structure formed by the links 143 and 146 expands and collapses as the risers 142 move away and toward one another as the stroller is set up or collapsed, respectively. The risers and links also add some stability and rigidity to the overall frame structure.

Yet another of the traversing structures is an upper cross-brace 150 that extends between the rear frame extensions 128 near the handles 126. The upper cross-brace 150 is reconfigurable between a stiff condition and a loose, collapsible condition as described below. When in the stiff condition, the upper cross-brace 150 adds additional stability and rigidity to the overall frame assembly when in the in-use configuration.

A lower cross-brace 160 interconnects and extends between the lower ends 122 of the rear legs 123 in this example. The lower cross-brace 160 has a center hub 162 that allows the cross-brace to pivot and collapse in a width or side-to-side direction. When in the in-use configuration as shown in FIGS. 1-3, the lower cross-brace adds significant rigidity and stability to the overall frame assembly 102.

One linking structure of the frame 102 includes a pair of seat side links 164, one on each side 102a and 102b of the frame assembly 102. Each side link 164 supports a side of the seat bottom 108. A forward end 165 of each link 164 is pivotally connected at a pivot 166 to the joint assembly 130. The pivot 166 in this example is aligned with a bottom or forward end of the respective rear frame extension 128. A rear end 167 of each seat side link 164 is pivotally connected to a respective rear leg 123. The bottom ends 168 of the seat risers 142 pivotally connect to the respective seat link 164 near to but forward of the rear leg to seat link connection.

Another linking structure includes an armrest link 170 pivotally coupled at a pivot 171 to an armrest 172 that is part of each joint assembly 130 on each frame side. The armrest links 172 each depend down and connect at a pivot 174 to a fixed link 176 that projects forward from each joint assembly 130. The pivots 174 for the fixed link to armrest link connections are positioned forward of the location of both the rear frame extensions and the front legs in the joint assemblies.

The stroller 100 disclosed herein collapses in three-dimensions. In other words, the stroller can collapse in an up and down vertical height direction, a fore and aft horizontal length direction, and a side-to-side width direction. Herein, these collapsing directions are also referred to synonymously with regard to reference planes. A horizontal reference plane refers to a vertical up and down collapsing direction. A vertical transverse reference place refers to fore and aft collapsibility. A vertical longitudinal reference place refers to side-to-side or width-wise collapsibility. The stroller 100 can be collapsed from the in-use or expanded condition shown in FIGS. 1-3 to the collapsed condition shown in FIGS. 4-6. Various structure details and features of the disclosed strollers are first described. Subsequently, the specific structures, configurations, and methods that permit and facilitate collapsing the disclosed strollers are described.

Referring now to FIGS. 7-13, one example of a handle 126 is described, keeping in mind that the two handles 126 in this example are essentially identical to one another. The handle 126 in this example is connected to a free end 178 of the respective rear extension 128 of the frame assembly 102. In this example, the rear extension 128 is a hollow, non-circular cylindrical tube with an interior 180 and a distal open end 182. In this example, the handle has a stem assembly 190 connected to the distal open end 182 of the rear extension 128. The free end portion 178 of one of the frame extensions 128 and an assembled and installed handle 126 are shown in FIG. 7. The handle 126 disclosed herein is adjustable using a single actuator in two different directions or modes. As shown in FIG. 7, the handle can slide longitudinally along an axis S of the stem assembly 190 to extend or retract the rearward position of the handle 126 on the rear extension 128. The handle 126 can also be rotated in this example about the axis S to adjust the angular orientation of the handle. One example of a mechanism arrangement that can accomplish dual-mode adjustment using a single actuator is described herein.

FIG. 8 shows a partial cut-away, partial cross section of a portion of the handle 126 and tube extension 128 shown in FIG. 7. The stem assembly 190 as shown has an exterior decorative cover 192 that is sized and shaped to slip over the free end 178 of the rear frame extension 128. The stem assembly 190 has an interior core 194 with a body section 195 that is sized to closely but slidably fit within the interior 180 of the rear extension 128. FIG. 9 shows a perspective view and FIG. 10 shows and end view of the stem core 194, which has a hollow interior divided into different shaped regions. The hollow interior extends the length of the stem core 194 along the stem axis S. In this example, the stem axis S is concentric with the rear frame extension axis when the handle 126 is installed.

An open interior section 196 of the hollow interior within the elongate body section 195 has a generally rectangular cross-section. The interior section 196 extends over a substantial portion of the body section's length. The body section 195 has an exterior surface 198 that corresponds to the shape of the rear extension interior 180. In this example, the exterior surface 198 of the stem core body section 195 has a pair of flat sides 200, a pair of rounded sides, and a pair of elongate slots 202. One slot 202 extends along a substantial portion of the length of the stem core and is located on each of the flat sides. Each slot 202 extends through the core body from the exterior surface 198 to the interior section 196.

An annular collar 204 has a generally circular configuration sized larger than the circumference of the exterior surface 198 of the body section 195. The collar 204 terminates one end of the body section 195. A connector 206 extends beyond the collar 204 in a direction opposite the body section 195 on the stem core 194. The connector 206 in this example has a circular cylindrical tip 208 that terminates in a radially outwardly extending annular flange 210. The connector tip 208 has an exterior cylindrical surface 211 adjacent the flange 210 and a pair of opposed relief slots 212. The slots extend axially along and through the surface 211 from the open end at the flange 210. The slots 212 serve a dual purpose, each of which is described in greater detail below. A ribbed region 214 is positioned between the surface 211 of the tip 208 and the collar 204. The ribbed region 214 includes an annular flange 216 extending around the circumference of the tip. A plurality of ribs 218 in the ribbed region 214 extends axially between the flange 216 and the collar 204. The ribs 218 project radially outward from the tip 208 and add strength and rigidity to the connector end 204.

As shown in FIG. 9, the relief slots 212 in the connector tip 208 extend longitudinally and are opposed 180° from one another in the surface 211. The length or extent of the relief slots 212 in the direction of the collar 204 is such that the slots impinge on the location of the flange 216. Thus, in the ribbed region 214, the flange 216 is curved toward and connects to the collar 204 and follows the contour of the ends of the slots 212. A cylindrical bore section 220 of the core's hollow interior extends from the end of the tip 208 along the stem core 194 to the interior section 195 of the body section 195.

The handle 126 also has a grip body 230 shown in perspective view in FIG. 7. The grip body 230 in this example is sized and configured to be grasped by one hand of a user. The grip body 230 has an elongate exterior gripping surface 232, a free end 234, and an attachment end 236. The attachment end 236 is shown detached from the stem assembly 190 in FIG. 11. The grip body 230 in this example has a grip axis G oriented generally along the length of the body. In this example, the attachment end 236 has a contoured through-opening 238 in the grip body that is oriented generally perpendicular to the grip axis G. As shown in the cross section view of FIG. 12, the attachment end 236 of the grip body 230, including the through-opening 238, is clearly visible. The opening 238 extends (with respect to the stroller front and rear) from a rear side 240 of the grip body 230 to a forward facing or front side 242.

A relatively wide, deep recess 244 defines a portion of the through-opening 238 on the rear side 240 of the grip body 230. In this example, the handle actuator is a push-button 246, which is slidably received in the recess 244. A connector bore 248 is smaller in size than the recess 244, communicates at one end with the recess 244, and forms an intermediate portion of the through-opening 238 in this example. The connector bore 248 has an interior surface 249 sized to closely match the exterior surface 211 of the connector tip 208 on the stem core 194. Near the front side 242 of the grip body 230, an intermittent relief region 250 forms another part of the through-opening 238 and communicates with the other end of the connector bore 248. A plurality of radially outwardly recessed ways or relief notches 252 are intermittently recessed into the grip body material. The notches are circumferentially spaced apart around the relief region 250. A guide bore 254 defines the opposite end of the through-opening 238 on the front side 242 of the grip body 230. The guide bore 254 is sized to receive the exterior surface 256 of the flange 216 on the stem core 194. The interior surface 258 of the guide bore 254 bears against the exterior surface 256 of the flange 216 as depicted in FIGS. 12-14, when the handle 126 is assembled.

To connect the grip body 230 to the stem assembly 190, the tip 208 of the stem core 194 is inserted in the through-opening, first through the guide bore 254 and the relief region 250. The tip 208 is then snapped through the connector bore 248 portion of the through-opening 238. The relief slots 212 permit the tip 208 to collapse, including the size of the flange 210 at the end of the tip 208, in order to fit through the connector bore 248. As can be seen in FIGS. 12-14, the tip 208 can snap back to its original configuration once the flange 210 clears the connector bore 248 and is positioned in the actuator recess 244 and retains the grip body 230 on the stem core 194.

The actuator, which in the disclosed example is a biased push-button 246, operates a mechanism in order to accomplish the dual mode handle adjustment. In this example, the button 246 is coupled to a slug 260. The button 246 is longitudinally fixed to the slug and, in this example, can rotate relative to the slug's axis, which is essentially the axis S. The slug 260 is received in a slug receptacle 262 on the bottom side or interior side of the button 246. A retainer 264 connects the button to the slug, but allows rotation of the button relative to the slug. In this example, the button 246 is a non-cylindrical shape, and matches the contour of the recess 244. Thus, as the grip portion 230 rotates about the axis S, so does the actuator or button 246. In an alternative example, the button can have a round cylindrical shape matching a circular cylindrical recess in the handle. In such an example, the actuator or button could remain stationary as the handle grip portion 230 rotates about the axis S. The opposite end of the slug 260 is connected to a driver mechanism 266 that actuates various components in the handle.

The driver mechanism in the disclosed handle example has a cam rod 270 extending longitudinally along the hollow interior of the stem core 194. A first section 272 of the cam rod 270 is positioned substantially in the bore 220 of the core's connector 206 and is coupled to the slug 260. A cam section 274 of the cam rod 270 extends longitudinally from the first section 272 along a substantial majority of the length of the core body's interior section 196. An underside of the cam section 274 has a longitudinal rib 276 received in a narrow longitudinal guide slot 278 formed in a surface of the interior section 196. A top side of the cam section 274 has a contoured surface. The surface has a proximal end 280 near the first section 272 of the cam rod, a distal cam projection 282 at the free end of the cam rod, and a flat region 284 between the end 280 and the projection 282. The flat region in this example has a length that is slightly greater than the length of the pair of opposed open slots 202 in the sides of the stem core body section 195. A proximal cam or ramped surface 286 is positioned at the proximal end 280. A distal cam or ramped surface 288 is positioned on the cam projection 282. Each of the cam surfaces 286 and 288, respectively, is angled facing the same direction (toward the free end of the cam rod) in this example.

The flat surface 284 is aligned along one edge of each of the core slots 202. The cam surface 286 and the projection 282 extend in a direction from the flat surface 284 toward the opposite edge of each of the slots 202. Thus, the core body section 195 is open through the slots 202 and across the adjacent flat region 284. Movement of the button or actuator 246 slides the driver mechanism 266 and the entire cam rod 270 along the hollow interior of the stem core 194. The cam driver in this example has a thin elongate blade-like shape over its length and its top and bottom surfaces are generally flat when viewed in cross-section. A spring 289 surrounds the first section 272 and is captured within the connector bore 220. One end of the spring 289 bears against the end of the slug 260 and the other end bears against a stop surface at the juncture between the bore 220 and the narrower width interior section 196 in the core's body section 195. The spring 289 biases the actuator or button 246 outward to its home position shown in FIG. 12.

A bow 290 is positioned within the core interior section 196 and has an arcuate or curved body 292. The body is curved concavely on the side facing the flat surface 284 of the cam driver 270. A nub or projection 294 protrudes from the opposite convex side of the bow 290. The nub is received in a receptacle 296 extending through a side of the core body section 195. The nub and receptacle retain the bow in a fixed longitudinal position along the stem core 194. As shown in FIG. 12, the bow 290 in side view has reduced thickness or thin regions 298 on either side of the nub 294. The thin regions permit the bow 290 to flex from its natural arcuate shape to a more linear shape as shown in FIG. 13.

A fixed pin 299 is inserted laterally across the interior 180 of the frame extension tube 128 and passes through both of the core slots 202. As shown in FIG. 12, a rounded, enlarged end 300a, 300b is formed on each of the opposed ends of the bow 290. Each end 300a, 300b has a curved external bearing surface 301a, 301b, respectively, that contacts the cam surfaces 286 and 288. The bearing surfaces 300a, 300b each smoothly and gradually curves and transitions from the top convex surface of the bow to the bottom concave surface in this example. A recessed surface 302a, 302b is formed into the body 292 of the bow positioned adjacent each end 300a, 300b. Each recessed surface 302a, 302b is sandwiched between the respective ends 300a, 300b on one side and a respective raised projection 304a, 304b spaced inward from the ends. The bow 290 can be formed from any number of suitable resilient, flexible, and yet somewhat stiff materials and perform the intended purpose as described below.

The end of the slug 260 coupled to the cam rod 270 also has an elongate pin 310 passing laterally or transversely through and extending beyond opposite sides of the slug. The exposed ends of the transverse pin 310 extend into the slots 212 in the connector tip 208. The terminal ends of the relief slots 212 match the curvature of the pin 310 circumference and the exposed pin ends bears against the ends of the relief slots 212. As a result, the slug 260 and the pin 310 do not rotate within the stem core 194. As can be seen in FIG. 12, the ends of the pin 310 extend radially beyond the surface 211 of the connector tip 208. The pin 310 aligns longitudinally along the stem axis S with the relief region 250 of the grip body 230 when the button is biased to its home position of FIG. 12. The pin ends can thus be seated in an opposed pair of the notches 252 in the attachment end 236 of the grip body. The grip body 230 in this configuration can not rotate because it is restrained by interference of the pin 310 seated within the notches 252.

The dual mode function of the handle 126 in this example is described with reference to FIGS. 12-14. FIG. 12 shows the handle 126 in a retracted position on the rear frame extension 128 and with the actuator or button 246 in the outwardly biased or home position. In this arrangement, the pin 299 is captured between the projection 304*a* near the proximal enlarged end 300*a* of the bow 290 and a proximal end of the slots 202. The pin 299 is also captured between the recessed surface 302*a* and the flat surface 284 near the proximal end 280 of the cam section 274.

As shown in FIG. 13, the actuator or button 246 can be depressed to a release position within the recess 244. This frees the handle 126 to be either extended, rotated, or both as desired by the user. Adjustment of the handle extended position is described first.

When the button 246 is pushed into the recess 244 of the grip body 230, the slug 260, its pin 310, and the cam rod 270 are all move longitudinally in unison in the same direction. The bearing surfaces 301*a*, 301*b* on the opposite ends 300*a*, 300*b* of the bow 290 ride along the respective ramp or cam surfaces 286 and 288. The ends 300*a*, 300*b* of the bow 290 are pushed away from the cam rod 270, which flattens out the bow as shown in FIG. 13. The projections 304*a*, 304*b* move away from the driver 270 when the bow flattens or flexes. This provides clearance for the frame extension pin 299 to freely travel along the slots 202. The handle 126 can then be slid along the frame extension tube 128 from its retracted position (FIG. 12) to an extended position (FIG. 14) until the pin 299 seats against the opposite ends of the slots 202. A portion of the stem core body 195 extends from the open end 182 of the frame extension tube 128 in this configuration.

If a user only wishes to adjust the handle extension and has done so, they can then release the button 246. The spring 289 biases the button 246, the slug 260, the pin 310, and the cam rod 270 back to the home, locked positions of FIG. 12. When the components return to the locked positions, the bearing surfaces 301*a*, 301*b* on the ends 300*a*, 300*b* of the bow 290 to ride back down the ramps or cam surfaces 286 and 288. The resiliency of the bow material returns the bow 290 to its curved shape. The frame extension pin 299 is captured on one side by the projection 304*b* and on the other side by both the cam projection 282 and the ends of the slots 202. The pin 299 also seats against the recessed surface 302*b* and the flat surface 284 in the extended, locked configuration of the handle 126.

If the user wishes to adjust the handle rotational position, they can do so either at the same time they adjust the handle extended position or independently. With the button 246 depressed to the release position as shown in FIG. 13, the grip body 230 can also be rotated about the stem axis to a desired angular orientation. In the release position, the slug 260 and its pin 310 move longitudinally and exit the notches 252 in which the ends of the pin previously resided. The grip body 230 is free to rotate about the connector 206 of the stem core 194. A user can orient the grip body to the desired rotational position and then release the actuator or button. The spring 289 biases the components to the release position, during which the pin 310 will drop into the nearest adjacent opposed pair notches 252.

The cover 192 of the stem assembly 190 can be a tube having an exterior surface 312 contoured to achieve desired aesthetic characteristics. During assembly of the stroller, the cover 192 can be slipped over the open end 182 of the frame extension tube 128 prior to installation of the stem core 194. The frame extension pin 299 can then be installed to secure the stem assembly 190 on the extension 128. As the handle is fully assembled and installed, the cover can be slid up to the installed stem assembly and snapped on, twisted and locked, or otherwise connected to the collar 204 or other portion of the stem assembly. When installed, the cover 192 hides the fixed pin 299 and other core components. In one example, a ring (not shown) can be provided covering the abutting surfaces of the grip body 230 and the cover 192. Such a ring can be utilized as an aesthetic attachment or, in addition, as a device to add some stability to the assembled handle 126.

As will be evident to those having ordinary skill in the art, the particular details of the handle construction can vary and yet fall within the spirit and scope of the present invention. Mechanisms in the handle stem can be altered to provide more than two linear travel stop positions selected by a user. Details of the bow and driver can also be varied considerably. Alternative mechanisms can also be utilized. The shapes, contours, orientation angles, and the like of the handles and handle components can be varied from the example disclosed without departing from the spirit and scope of the present invention.

The disclosed handles 126 are umbrella-type handles provided for grasping by a single hand of a user. Each handle has an actuator that can be manipulated by a user to render the handle adjustable in more than one direction, mode, plane or axis of movement. In this example, by simply pressing the actuator on the handle, a user can rotationally adjust the handle as well as extend or retract the handle longitudinally along its axis. The handles 126 can be utilized on virtually any type of stroller. Their use is not intended to be limited only to a three-dimensional collapsible stroller. The collapsible stroller 100 is described herein merely as a platform to illustrate a number of different stroller features of the invention. The dual mode adjustable handle can be used on non-collapsible strollers, two-dimensional collapsible strollers, multiple occupant strollers, or the like.

The stroller 100 disclosed herein includes a rear brake system that can be actuated by a user using the same brake actuator to both lock and release the brake mechanisms on both rear wheel assemblies 119. In the disclosed example, the brake actuator is center-mounted on the hub 162 of the rear, lower cross-brace 160 of the stroller, and yet the stroller 100 is capable of collapsing in three dimensions.

Each rear wheel assembly 119 has a brake mechanism. One example of a wheel brake mechanism is described herein with reference to FIGS. 15-24. As noted above, the lower cross-brace 160 in this example interconnects portions of the frame sides 102*a* and 102*b* near the rear wheel assemblies 119. The lower cross-brace 160 in this example is divided into two brace sections 350*a* and 350*b*. These sections are interconnected at the center of the cross-brace at the hub 162. The cross-brace sections 350*a* and 350*b* are pivotable relative to one another at the hub 162 as described below. FIG. 15 shows a subassembly of the stroller 100 including the rear frame legs 123, the rear wheel assemblies 119, and the cross-brace 160. FIG. 16 shows an underside, close-up perspective view of one of the wheel assemblies 119.

Figures 17, 18:
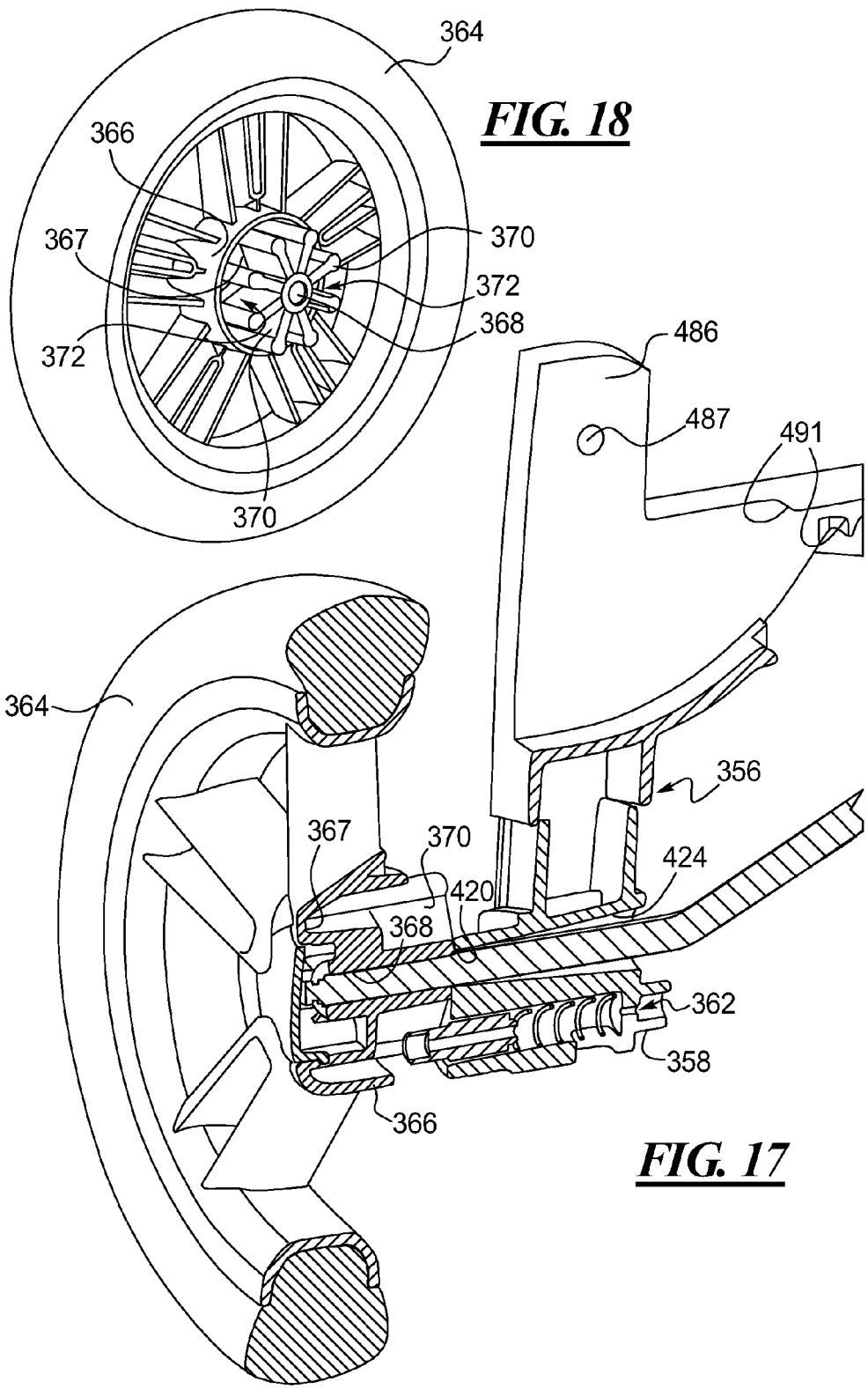
FIG. 17 is a cross section of a rear wheel assembly and taken along line 17-17 of FIG. 15.
FIG. 18 is a perspective view of a rear wheel of the stroller subassembly of FIG. 15.
Figure 24:
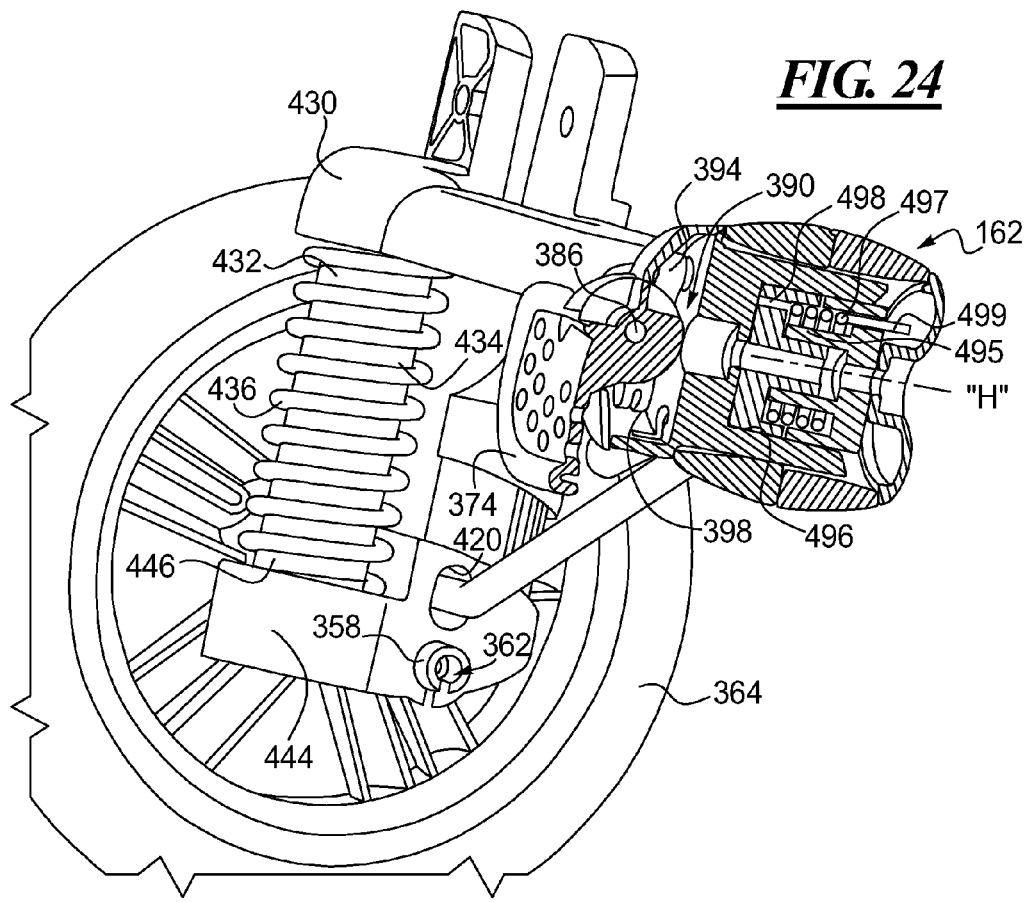
FIG. 24 is a cross section of part of the rear wheel and leg subassembly and taken along line 24-24 of FIG. 15.

The disclosed brake system uses a pair of linear actuator cables 354 each having a proximal end coupled to the brake actuator at the hub 162. The distal end of each cable 354 is routed to a respective one of the rear wheel assemblies 119 and is connected to an interior side of a rear wheel strut housing 356. As shown in FIGS. 16 and 17, one end of the actuator cable 354 is received in a cable receptacle 358 in the housing 356 at each wheel assembly 119. A push-pull core 354*a* of the cable extends through a sleeve 354*b* as is conventionally known. A brake lug 360 is carried on the distal end of the core 354*a*. The brake lug 360 extends through a cable bore 362 in the strut housing 356 to the opposite exterior side of the strut housing. Each wheel assembly carries only a single rear wheel 364 in this example. The brake lug 360 faces the rear wheel 364.

FIGS. 16 and 18 show an interior side of the wheel 364. Each rear wheel 364 has a wheel hub 366 with a center axle bore 368 and a plurality of fanned out ribs 370. The ribs 370 extend radially outward relative to the axle bore 368, are spaced apart circumferentially around the axle bore, and have a length in an axial direction. The spaces between the fanned out ribs 370 form brake lug receivers 372. To lock the brake mechanism, the core 354a of the cable 354 must push the brake lug 360 toward the wheel 364 and into one of the receivers 372 (see FIG. 19). The lug will be sandwiched between a pair of the ribs 370 and prevent the wheel from rotating. To release the brake mechanism at each wheel, the core 354a of the cable must pull the lug 360 out of the receiver 272.

FIGS. 20-24 show features of the brake actuator located at the hub 162 in the present example. The brake actuator has a lever or paddle 374 that extends rearward from the hub 162. A stanchion 376 extends from the paddle and carries a cylinder 377 with a transverse pivot bore 378 extending through the cylinder in a direction generally parallel to the width of the paddle in this example. A hub cap 380 covers a portion of the rear facing side of the hub 162. The hub cap in this example includes a pair of rear projection stanchions 382 that are spaced apart on the cap. Each of the stanchions has a pivot hole 382 formed therein that align with the pivot bore 378 of the paddle 374. A pivot pin 386 is received through the pivot holes 384 and the aligned pivot bore 378, pivotally mounting the paddle 374 to the cap 380.

The cap 380 covers a component recess 390 in the rear side of the hub 162. A pair of brake links 392 is pivotally mounted in the recess 390. One end of each link 392 is mounted at a respective dedicated pivot 394 about which the links can rotate. The core 354a of each linear actuator cable 354 has a proximal end with a second lug 396 (see FIG. 20) secured to the free end 398 of a respective one of the links 392. In this example, the cable of one side of the stroller is connected to the opposite link. Thus, the links 392 in this example are rotated outward away from one another to release the brake lugs and rotated toward one another to lock the brake lugs.

Figure 23:
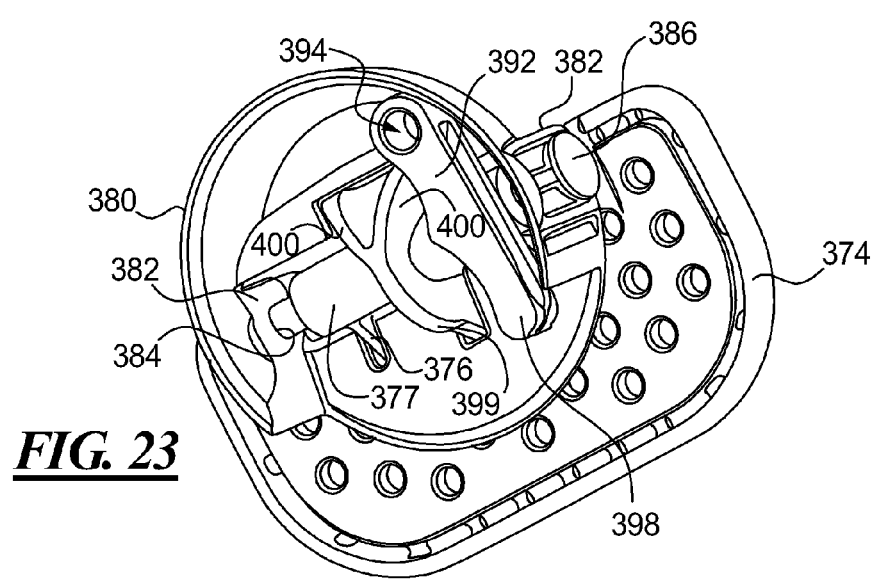
FIG. 23 is a cross section view of the foot paddle and one brake link taken along line 23-23 of FIG. 19.

The brake paddle 374 has an annular flange 399 that extends radially outward around the cylinder 377. The flange gradually splits apart around part of its circumference into a pair of cam surfaces 400 that spiral axially in opposite directions along the axis of the cylinder 377. The cam surfaces 400 are best shown in FIGS. 21-23 to be above the pivot axis of the paddle when the paddle is downwardly positioned as in FIGS. 23 and 24. The cam surfaces rotated downward when the paddle is lifted or pivoted upward. The cam surfaces bear against portions of the links 392 and rotate the links about their respective pivots 394 according to movement of the paddle 374. In this example, a user lowers the paddle 374 to lock the brakes and raises the paddle to release the brakes. As shown in FIG. 17, a spring 402 in the cable bore 362 of each strut housing biases each brake lug 360 toward the braking position, drawing the lower ends of the links 392 toward one another. As the paddle is raised, the cam surfaces 400 rotate downward, pushing the links apart and pulling the cables 354 to release the brakes.

The brake mechanism parts, functions, and operation can vary within the spirit and scope of the present invention. The paddle can be provided with an over center feature to assist in holding it in the selected paddle position. The brakes can lock and release with different or the reverse paddle movements from the disclosed example. As will be evident to those having ordinary skill in the art, the particular configuration of each of the parts that form the brake system disclosed herein can vary in configuration and construction and yet fall within the spirit and scope of the present invention. The wheel hub and brake rib arrangement can be replaced with other suitable brake mechanism configurations. Similarly, the linear actuator cable routing can vary from that disclosed herein. Further, the particular arrangement, shape, and orientation of the brake lever paddle 374, pivot parts, cam surfaces, actuator links, and hub can vary in configuration and construction as well and yet fall within in the spirit and scope of the present invention.

The rear wheel assembly suspension system is next described with reference to FIGS. 15-17 and 24-26. Each rear wheel assembly 119 in this example has a single rear wheel 364 supporting on an axle 410. In this example, each axle 410 is formed integrally as part of a stabilizer rod 412. The rods 412 each have one end 414 pivotally connected to a bracket 416 carried by the respective brace sections 350a and 350b on opposite sides of the hub 162. Each rod 412 extends from the bracket toward the corresponding strut housing 356. The rods each have a bend 418 in this example. The axles are those parts of the rods beyond the bend 418.

An axle bore 420 is formed through each of the strut housings forward of a rear suspension unit 422 in this example. As shown in FIG. 17, the axle bore is tapered and has a larger diameter section 424 on the interior side of the strut housing. This tapered section 424 region permits some play for the axle 410 of the stabilizer rod 412, both for when the stroller is folded as shown in FIGS. 4-6 and when the suspension moves as intended during use of the stroller. The rear wheels 364 can be mounted to the free end of the axle portions 410 of the stabilizer rods 412 in a conventional manner.

In this example, a strut housing 356 is carried on one end of each respective cross-brace section 350a and 350b. Each strut housing 356 in the disclosed example has an upper housing component 426 and a lower housing component 428 as shown in FIGS. 25 and 26. The two housing components telescope relative to one another as part of the function of the rear suspension units 422. The upper housing component 426 carries a strut cup 430 on the rear side of the housing. The strut cup 430 faces downward and retains a top end 432 of a tubular strut 434 in each rear suspension unit 422. A helical spring 436 surrounds each of the strut tubes 434. An upper end 438 of the spring 436 abuts against an exposed surface 440 of the cup 430.

The lower housing component in each rear suspension unit 422 has a strut guide sleeve 444 that is completely open. The sleeves each have a diameter sized to slidably receive a bottom end 446 of the respective strut tube 432. Each of the lower housing components 428 has an upper face 448 surrounding the guide sleeve 444 that acts as a lower spring stop surface for a lower end 454 of the spring 436.

The axle bore 420, the axle portion 410 of the stabilizer rod 412, the cable end receptacle 358, and the distal end of the actuator cable 354 on each wheel assembly 119 are carried by the lower housing components 428. Thus, each rear wheel 364 is rotationally fixed to a respective one of the lower housing components 428. In the disclosed example, each upper housing component 426 is integrally formed on one end of each respective cross-brace section 350a and 350b. As upward force is applied to each wheel 364 during use of the stroller, the lower strut housing components 428 can telescopically slide upward relative to the upper housing component 426s. The strut tubes 434 can slide down through the guide sleeves 444 as the springs 436 compress. The springs 436 will bias each of the rear suspension units to their unloaded or home condition when unloaded. Thus, the springs 436 provide shock absorbing and dampening capability for the stroller.

The rear wheel assemblies 119 fold inward when the disclosed stroller is collapsed. The disclosed components that accomplish this motion are next described with reference to FIGS. 6, 16, 26, and 27. An exploded view of the two major components of each brace section 350*a* and 350*b* is shown in FIG. 27. Each brace section includes a lower leg connector 470 and a cross-member 472. In the disclosed example, each leg connector 470 is pivotally connected to an outer end 473 of a respective one of the cross-members. Each connector 470 has an end cap 474 that has a hollow, open top 475. The end caps 474 are oblong shaped cylinders that are vertically oriented. The end caps slip over and are attached to the lower ends 122 of the rear legs 123, with the legs received in the open tops 475. The end caps in this example are secured to the legs 123 in a conventional manner using fasteners installed through a pair of upper fastener openings 476. These openings are positioned near and on opposite sides of the open top 475 in the end cap.

The bottom of the end cap 474 has a pair of upwardly open slots 478. A downward extending guide and stabilizer 480 is positioned between the slots 478 in each of the connectors 470. The stabilizers project downward from their respective connectors 470. The stabilizers 480 act as a rotational travel limiter, a rotational guide, and a structural stabilizer for the joint in the cross-brace sections. In the disclosed example, the side surfaces 481 of the stabilizers 480 are substantially smooth. The stabilizers 480 in this example have a downward depending part 482 positioned between the slots 478 and defining the inner limits of the slots for each connector 470. The outer parameters of the slots 478 are defined by various exterior sidewalls 483 of the oblong cylinder shaped end caps 474.

Each stabilizer 480 also has an angled part that extends down, but angles inward toward the center of the lower cross-brace 160. In the disclosed example, the angled parts are oriented at an angle of about 45° relative to an axis of the connectors 470. If such a stabilizer structure is in a stroller, that angle can vary considerably and yet fall within the spirit and scope of the present invention. The angled parts each terminate at a distal end, which are each configured to define a stop surface 485. In this example the stop surfaces 485 face upward and are oriented in this example at about 45° relative to the angled parts and about 90° relative to the connector vertical axes. The stop surfaces 485 bear against an underside portion of the cross-member 472 when the stroller is in the in-use configuration. The stop surfaces 485 can act as travel limiters to properly orient the cross-members 472 relative to the leg connectors 470, and can add structural stability to the stroller, when the stroller 100 is in the in-use configuration.

Each cross-member 472 has a pair of upstanding pivot arms 486 on the outer end 473. The arms are configured and sized to slip into the slots 478 of the connectors. The pivot arms 486 each include a pivot opening 487 which are aligned with one another. Each leg connector 470 has a pair of similar pivot openings 488 in opposed portions of the sidewalls 483 near the slot openings in the bottom of the connector. When the cross-members 472 are connected to the connectors 470, the openings 487 align with the openings 488. A stabilizer slot 489 extends into the outer end 473 of each of the cross-members 472 and is positioned between the spaced apart pivot arms 486. As shown in FIGS. 17 and 27, each stabilizer slot is sized to receive the respective stabilizer 480 and to permit rotation of the stabilizer within the slot.

A pivot pin or hinge pin 490 is installed separately through each pair of pivot openings 487 and 488 in each of the pivot arms 486 and the adjacent sidewall 483 of the connectors. In an alternative example, a single pin can be extended through the entire assembly as long as opening is provided through the depending part 482 of the stabilizer 480 in this example.

When the stroller is in the in-use configuration, each leg connector 470 and cross-member 472 assembly is arranged in a right angle in this example. The angled part 484 of the stabilizer 480 is partially exposed at the joint between these two components and adds stability to the structure. The distal ends of the stabilizers 480, including the stop surfaces 485, are positioned beneath the respective cross-members 472. The stop surfaces 485 and top surfaces 491 of the stabilizer bear against complimentary surfaces 492 on the underside of the cross-members for stability and to limit travel.

As shown in FIGS. 26 and 27, the hub 162 is formed of two hub halves or parts 162*a* and 162*b*, one each carried on the inner end 492 of each of the cross-members 472. Each hub part 162*a* and 162*b* has a generally rounded side 493 and a flat side 494. The rounded side 493 of one of the cross-members formed the brake component or hub recess 390. The flat sides 494 are configured to bear and slidably rotate against one another when the cross-brace 160 is assembled. One of the hub parts 162*a* has a centered male cylinder 495 that projects beyond a plane of the flat side 494 of that part. The male cylinder 495 is received in a female cylinder 496 of the other hub part 162*b*. The male and female cylinder align the hub parts with one another but permit rotation between the two parts about an axis H of the hub. A torsion spring 497 is provided within the assembled hub 162. An end 498 and 499 is connected to each of the cross-members 472 within the hub parts 162*a* and 162*b* and assists to bias the cross-brace to its extended, unfolded orientation.

As will be evident to those having ordinary skill in the art, the cross-members 472 and connectors 470 can vary in construction. In one example, the components can be injection molded plastic with ribs and projections added for strength and rigidity. Alternately, the parts can be made from metal, and can be cast, stamped, welded, and/or the like. The particulars of the pivot joint can also vary from that shown. The shape and arrangement of the parts can vary, and the components can be switched between the parts. The stabilizer 480, slots, and pivot arms can be altered from that shown at yet provide the desired pivoting joint function. Various alternative travel or rotation limiters can also be provided to supplement or replace the structures disclosed.

The upper cross-brace 150 is next described with reference to FIGS. 28-35. In the disclosed example, the upper cross-brace 150 incorporates a pair of adult or parent cup holders 500 in the brace. The cup holders 500 are integral with the brace and yet the brace can collapse or break down to permit the stroller 100 to collapse in a width or side-to-side direction. The upper cross-brace 150 in this example is reconfigurable between a loose, collapsible condition (see FIG. 4) and a stiff condition as shown in FIGS. 28-30, wherein the brace assists to stiffen and stabilize the stroller frame 102.

As shown in FIGS. 28 and 30, the upper cross-brace 150 has three basic components pivotally connected to one another. The brace 150 has a handle assembly 502 positioned centrally on the brace between the pair of cup holder assemblies 500. The opposed distal ends of the cross-brace 150 each include a saddle shaped brackets or devises 504. Each bracket or clevis 504 is U-shaped in cross section, but has an elongate length in an axial direction. Each clevis 504 has an elongate interior surface 505, a lengthwise axis, and an open side 506. The surface 505 is semi-cylindrical and contoured to match the shape of the rear frame extension tubes 128. A pair of extensions 507 project axially from one end of each clevis 504. The extensions 507 on each clevis 504 are spaced apart across the open side 506. A hole 508 is formed through each extension 507 of each clevis 504. The holes 508 are for pivotally attaching each clevis 504 to a respective one of the frame extensions 128.

In this example, the devises are oriented so that the extensions project toward the handles 126. The devises are positioned between the frame extensions 128 with the interior surfaces 505 facing outward. Each bracket 504 can pivot about the attachment points 508 in an arc toward and away from the respective frame extension 128. In the disclosed example, the interior surfaces 505 will pivot downward and outward by gravity into contact with their respective frame extension 128. Each clevis 504 can be secured to the top and bottom of the exterior surface 180 of the corresponding frame extension 128 using each pair of holes 508. A single clevis pin, rivets, or other conventional fasteners can be used to attach the devises 504. In the disclosed example, devises or brackets can not rotate circumferentially around the frame extension tubes 128.

In the stiff brace configuration of FIGS. 28 and 29, the interior surface 505 of each bracket lies adjacent the exterior surface 180 of the respective frame extension 128. In this configuration, the brackets are forced against and can not swing away from the frame extensions. When in the collapsed or loose configuration, the devises 504 are free to swing within their travel arc relative to the frame extensions 128 about the attachment points 508.

In the disclosed example, the devises 504 are integrally connected to a portion of the cup holders 500. The longitudinal axis along each clevis is oriented at an angle relative to a plane of the cup holder assemblies in this example. This is so that the open sides 506 and surfaces 505 of each clevis 504 align with the frame extensions while the cup holder assemblies 500 are positioned in a proper, level orientation when the stroller is in the in-use configuration as depicted in FIG. 1.

In the disclosed example, each cup holder assembly 500 has a cup-shaped receptacle 510 with a closed bottom, a cylindrical side wall 512, and an annular, radially outwardly extending lip 514. Each assembly 500 also has a support ring 516 and a bridge 526 extending from a side surface of the ring. In this example, the bridge 526 of each assembly is formed with the ring 516 and the clevis 504 as a unitary or one-piece structure. The rings each have an opening sized to slip over the bottom and side wall 512 of one of the receptacles 510. The lips 514 are sized to rest upon an upper edge of the rings 516. When in use, the bridges 526 and the devises 504 are positioned at the outermost ends of the cross-brace 150.

Each support ring 516 has a handle connector 530 extending from a side of the ring opposite the bridge 526 and clevis 504. The handle connectors 530 each have a stem 532 projecting toward the handle 502. The handle connectors 530 each also have a puck 534 carried by the stem 532 as can be seen in FIGS. 31 and 32. In the disclosed example, each puck is a disk-shaped body that has a puck plane, a thickness, a center, and a generally circular perimeter. A pair of axles 536 project in opposite directions from the center of each puck 534 and generally perpendicular to the puck plane. Each of the axles 536 and stems 532 in this example is formed integrally with its respective puck.

The handle assembly 502 has a pair of oblong cover plates 540 positioned facing or confronting one another. Each plate has a perimeter lip 538 extending around portions of the plate perimeters and projecting out of plane from the plate toward the opposite plate. Each plate 540 also has rounded opposed ends 542. The pucks 534 are positioned at the opposite ends 542 of the cover plates 540 and are sandwiched between the plates. When the cover plates 540 are assembled together, a gap 543 is formed on each end of the handle assembly 502 between adjacent perimeter lips 538. A portion of the perimeter of each puck 534 from which the stem 532 projects is exposed at each gap 543. The gaps permit the pucks 534 and the respective stems 532 to rotate about the axle pins 536 relative to the handle assembly 502. As shown in FIG. 31, an inward facing, oval-shaped axle receptacle 544 is formed near each end 542 of each cover plate 540. When the cover plates sandwich the pucks 534 between them, each axle pin 536 of each puck 534 is received in a corresponding ones of the oval receptacles. The pucks 534 are thus rotationally retained in position in the handle assembly. The oval receptacles permit slight movement of the pucks toward an away from one another.

Each of the pucks 534 also has a pair of openings 550 extending axially through the puck, i.e., perpendicular to the puck plane. The openings 550 are spaced slightly inward from the puck perimeter and positioned about 180° opposed to one another around the puck circumference. The openings 550 on each puck 534 are also positioned about 90° circumferentially offset from the position of the stem 532. The openings 550 are for receiving link pins 552 as shown in FIG. 31. Each of the pucks 534 in this example also has a radially extending slot formed into a perimeter side wall 554 on a side opposite the puck stem 532. Each slot extends from the puck side wall 554 parallel to the puck plane and continues to the openings 550. In the disclosed example, the pucks 534, stems 532 and rings 516 are also formed as unitary or one piece integral components A pair of links 560 is oriented to form an X-shaped scissor link arrangement. The links 560 crisscross in the middle of the handle assembly as shown in FIGS. 30, 31, 34, and 35. One end of each link 560 is connected to the link pins 552 on one puck. The links crisscross one another and the other ends of the links are connected to the link pins 552 on the other puck 534.

A release button 562 is mounted within the handle assembly 502 and sandwiched between the two cover plates 540 and between the pivotal pucks 534. A part of the button 562 projects from a side edge of the handle assembly 502 between spaced apart and adjacent portions of the lips 538 of the cover plates 540. The button 562 has a relatively large exposed face 564 for gripping by a user, either with the palm of their hand or a plurality of their fingers. In this example, the gripping face 564 faces forward on the stroller and thus would be most often grasped by a user's fingers. The opposite edge 566 of the handle assembly 502 can be gripped by a portion of the user's hand, in this case the user's palm, and the button 562 drawn inward into the handle assembly 502. The button 562 can be depressed inward against the biasing force of a spring 568 or other biasing element as shown in FIGS. 34 and 35.

A leading end 570 of the button 562 within the handle assembly has a link release pin 572. The release pin 572 extends in a direction perpendicular to the direction of travel of the button in this example. A guide slot 574 is provided in a plate 576 sandwiched within the cover plates 540. The link release pin 572 can travel within the guide slot 574 from one end to the other according to movement of the button 562. As best illustrated in FIGS. 34 and 35, each of the links 560 has a relief or notch 578 formed in one edge. Each relief or notch 578 faces a direction opposite the button 562 and toward the link release pin 572. Each notch is at a slight angle relative to a side edge of the link in this example. This is because the notches are intended to lie parallel to the guide slot 574 even though the links are at a shallow angle to the slot 574.

Figure 34:
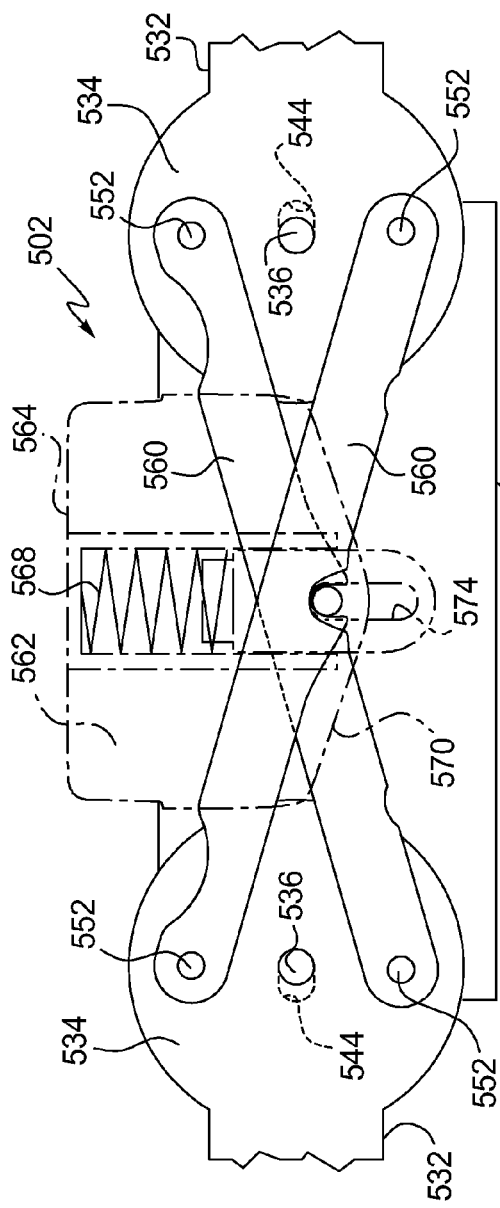
FIGS. 34 and 35 are schematic views of the handle assembly of the cross-brace of FIG. 28 and showing movement of the internal components.

As depicted in FIG. 34, when the cross-brace 150, including its three major components 500 and 502, is arranged in a generally linear orientation, the three major components are held in a relatively stiff or rigid condition. In this orientation, the notch or relief 576 in each link aligns with and overlies the other. The spring 568 biases the button 562 to its outward non-depressed condition. In this button position, the link release pin 572 is also drawn via the spring biasing force into the notches 576 in the links. The links 560 cannot move and, thus, the pucks cannot rotate in this arrangement. In this condition, the cross-brace 150 is essentially locked or held in the stiff structural support orientation.

Figure 35:
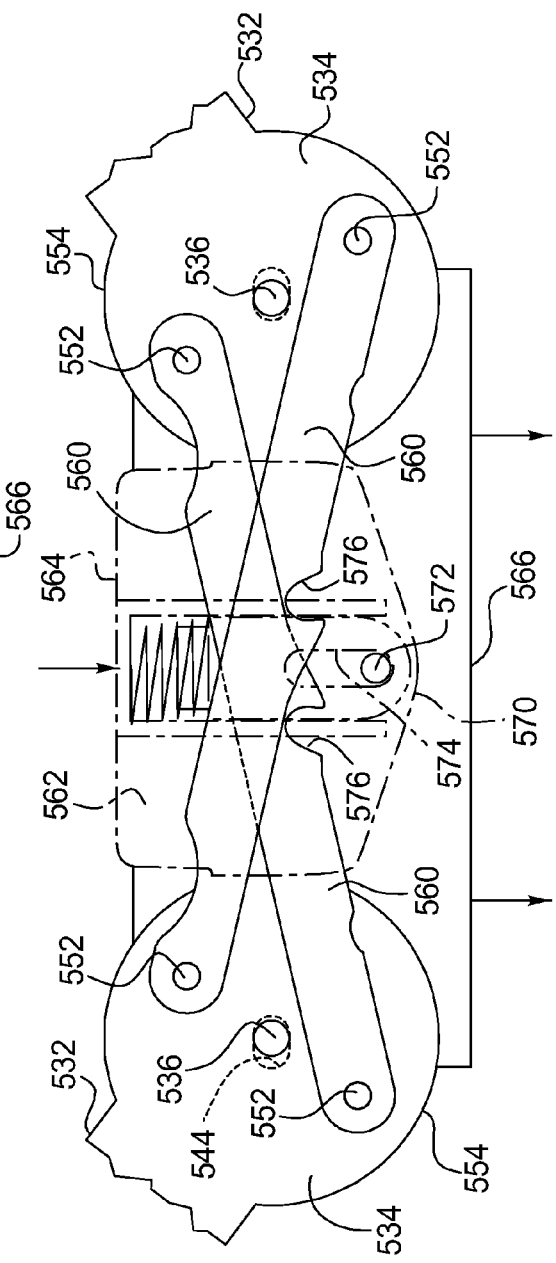
Figure 44:
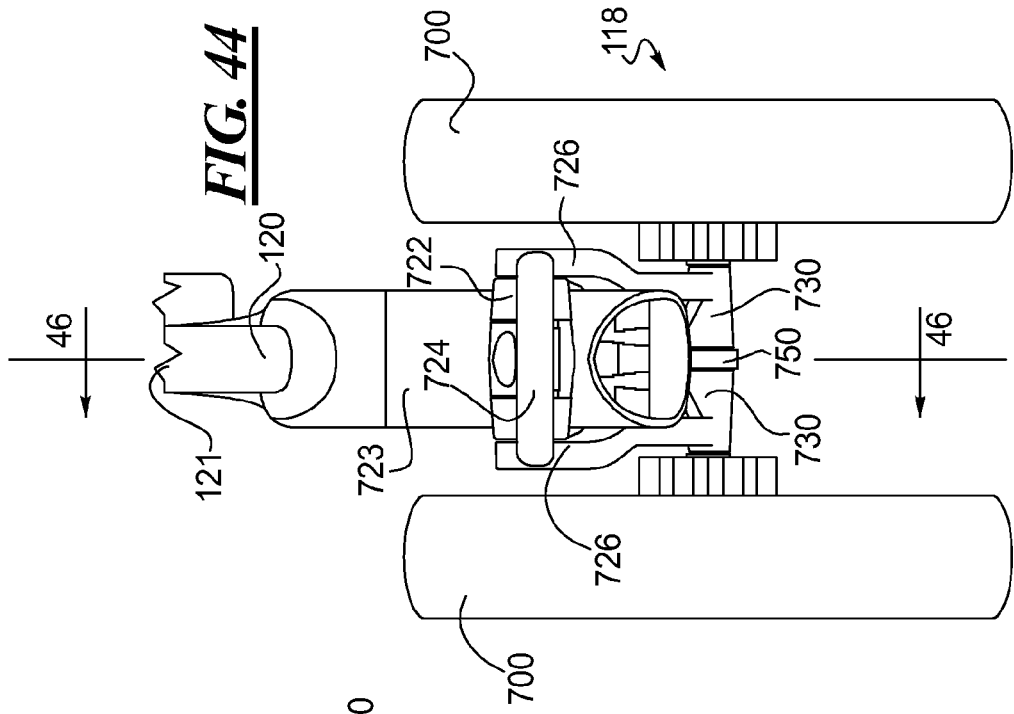
FIG. 44 is a front view of the front wheel assembly of FIG. 43.
Figure 45:
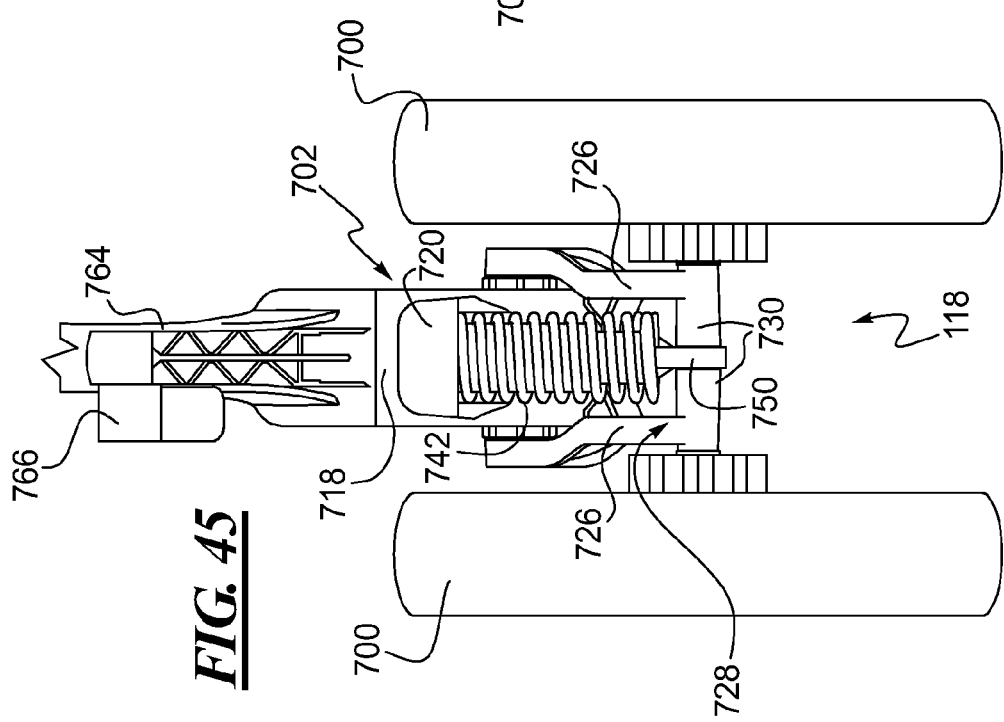
FIG. 45 is a rear view of the front wheel assembly of FIG. 43.

As shown in FIG. 35, when the button 562 is depressed inward into the handle 502, the link pin 572 is released from the notches 576. This permits the links to move freely within the handle assembly with rotation of the pucks 532 about their axial pins 536. When the links move far enough so that the respective notches 576 or relieves no longer overlie or align with one another, the link release pin 572 can not drop into the notches and can not lock the cross-brace in the stiff, linear orientation. Also in this condition, the cross-brace is free to fold or collapse. The three major components 500 and 502 are pivotally loosely connected to one another and the puck pivot pins 536. This permits the cross-brace to fold when the disclosed stroller is collapsed. To return the cross-brace 150 to the stiff condition, a user need only linearly align the two cup holder assemblies 500 with the handle assembly 502, which in turn will rotate the links and pucks. The spring 568 will bias the button 562 and release pin 572 back into the aligned notches 576.

Features of the passenger or child's tray assembly 124 are next described with reference to FIGS. 36-42. The passenger tray 124, when installed on the stroller 100 in the disclosed example extends across the frame assembly sides 102a and 102b and is positioned upward and forward of the seat 104 so that an occupant can utilize the tray as is conventionally known. The tray assembly 124 in the disclosed example has essentially three primary parts. One of those components is a tray section or insert 600 that provides a support surface 602, and in the disclosed example, a pair of recessed receptacles or bowls 604. In this example, each of the receptacles is essentially a cup-shaped bowl having a bottom surface 606 and a tapered upstanding side wall 608.

The tray insert 600 has a slight arcuate or curved shape with a bowed convex front wall 610 and a concave rear wall 612. The insert also has semi-spherical ends which surround and follow the contour of the bowls 604 and which are positioned at opposite ends of the insert. In the disclosed example, the bowls 604 have different contours and can be used for different purposes. One bowl has a continuously or smoothly curved shape for storing food items. The shape makes it easier for a toddler to remove the food items. The other bowl has a more angular shape that can be used as a cup holder. As will be evident to those having ordinary skill in the art, the particular contour of the tray insert 600, including its surfaces and receptacles, if any, can vary and yet fall within the spirit and scope of the present invention. Alternatively, one or more of the receptacles 604 can be eliminated entirely; although as described below, certain structures that perform tray folding or collapsing functions provided by these receptacles would have to be replaced in some manner.

The other primary tray parts include a pair of mounting components 620 that connect to and support the tray section or tray insert 600 when installed on the stroller. Each of the mounting components 620 is a mirror image of the other in the disclosed example. However, that certainly need not be the case. In the disclosed example, each of the mounting components can be attached or removed from the stroller independently. Each of the mounting components 620 includes a connector assembly 622 that attaches to part of the stroller. Each also includes a support arm 624 pivotally connected at one end to the connector 622 and pivotally connected to the tray insert at a respective end.

In this example, each connector assembly 622 has a body 623 with a projection 626 extending rearward from the body. The projections are configured to be received in a forward open end 628 of the armrests 172 of the stroller 100. As depicted in FIGS. 37-41, each connector assembly 622 also includes a latch mechanism that in the disclosed example removably but securely latches the connector 622 to the arm rest 172 when installed.

In this example, the latch mechanisms each include an elongate flexible finger 632 snapped into place within the projection 626. Each finger has a trunnion on one end with a pair of aligned pins 634. The projection has openings 636 provided in spaced apart surfaces 638 in the projection. The trunnion pins snap into the openings 636 to retain the finger in place. A button hole 640 is formed in an underside 642 of each of the connector bodies 623. A button 644 projects from the finger at its other end and is received in the button hole when the finger is installed. In the disclosed example, the button is biased downward through the hole 640 via resiliency of the finger. The button 644 can be depressed upward into the connector body, which flexes the finger 632. A bottom surface of the arm rest 172 has a latch opening 646 that receives a ramped tab 648 protruding from a bottom of the flexible finger 632.

The ramped tab 648 will automatically flex the finger upward as the projection 626 of the connector 622 is slid into place into the forward open end 628 of the arm rest 172. Once the latching face 650 on the edge of the ramped tab 648 is within latch opening 646 in the arm rest, the flexible finger 632 snaps into place. The latch tab or ramped tab 648 snaps into the latch opening 646. The connector 622 is retained in the arm rest open end 628 by interference between an edge of the latch opening 640 and the latch face 650. To remove the connector 622, one need only press upward on the button 644 to release the tab 648.

In the disclosed example, each of the support arms 624 has a bridging section 652 with one end pivotally coupled to one of the connectors 622. Each of the bridging sections 652 continues away from the connector to a supporting section 654. Each supporting section of the support arms 624 is received beneath and rotationally coupled to the tray insert 600.

As shown in FIG. 37, each of the support arms 624 is curved, but generally wedged shaped. Each has a front facing surface 656, a rear surface 658, and an end surface 660. Each supporting section 654 is also formed with a round cylindrical opening 662 surrounded by a perimeter supporting structure 664. When the tray is in the in-use configuration, the end surfaces 660 are positioned beneath the tray insert and out of view.

In the disclosed example, the front surface 610 of the tray insert has a mid-section 666 that has a length in this example that extends generally between the two storage receptacles 604, or about the length of the storage surface 602 between the storage receptacles. This mid-section 666 has a greater height dimension than the remaining portions of the front wall 610, the curved side walls 614, and slight end portions of the rear wall 612. In this example, the rear wall 612 also has a mid-section 668 that has a height dimension similar to the front mid-section 666. In the disclosed example, the remaining portions of the perimeter surfaces of the tray insert, including the ends 614 and the end portions of the front and rear walls 610 and 612 have a height about one-half that of the mid-sections 666 and 668.

The thickness or heights of the perimeter structures 664 of the support arms 624 also have a height in this example that is about one-half the height of the mid-section walls 666 and 668. When the tray 124 is assembled, the bowls 604 each drop into a respective one of the round openings 662 in the support sections of the support arms. As can be seen in FIGS. 36 and 37, when the tray is assembled, the front and rear surfaces 656 and 658, respectively, of the bridging sections 652 of the support arms form continuations of the assembled tray insert walls and generally match and follow the contours of the tray insert walls.

As shown in the underside view of FIG. 37 and the cross-section view of FIG. 42, each end surface 660 of the wedged-shaped support arms 624 has a curved contour and a lip 670 that extends radially outward from an upper edge pf the surface. The lip 670 follows a continuous arch of the wedged-shaped end surfaces 660. The underside 672 of the tray insert 600 includes a pair of tracks 674 that correspond in shape to the curvature and depth of the lips 670. Each of the tracks 674 has an L-shaped cross-section in this example. A lip 670 is received in and captured by each track 672 as shown in FIGS. 37 and 42. In this configuration, each of the support arms 624 can be rotated relative to the tray insert about an axis of the bowls 604 and round openings 604. The lips 670 remain at least partly captured within the tracks to smoothly guide rotation of the support arms 624.

As depicted in FIG. 37, the exterior surface 676 of each of the bowls 604 has one or more protruding annular ridges 678 extending around the bowl circumference. The ridges are formed at a position on the bowls 604 to snap through the round openings 662 in the supporting sections 654. The ridges bite beneath an underside of the perimeter structures 664 around the round openings 662. When the tray insert 600 is installed on the support arms 624, the bowls 604 snap into place in the round openings 662 to retain the insert 600 on the mounting components 620.

The bridging section 652 of each support arm 624 has a flat end 680 with a pivot opening. Each connector body 623 has a C-shaped end with a pocket 684 formed between two spaced apart extensions 686 and sized to receive the flat end 680 therein. Aligned openings are also formed one in each extension. A pivot pin 68.8 extends through the aligned openings in the extensions and the opening in the flat end 680 to form a pivot joint 690 between the connector assemblies 622 and the support arms 624. The support arms can pivot about the joints 690 relative to the connector assemblies.

The disclosed tray 124 can be removed completely from the stroller 100 by detaching the connector assemblies 622 from the arm rests 172. Alternatively, either end of the tray 124 can be removed from an arm rest of the stroller simply by depressing the button 644 on the underside of a selected one of the connectors 662 and detaching only that connector. The tray can be easily be pivoted out of the way of the seat using the pivot joint 690 at the opposite connector assembly 622 as well as the pivoting relationship between bowls 604 and the support arms 624. The tray 124 can also collapse width-wise by pivoting about the joints 690 to permit the stroller to collapse side-to-side laterally without the need for removing the tray.

The disclosed tray 124 provides another function described with reference to FIGS. 4 and 5. When the stroller 100 is collapsed, the support arms 624 rotate about the joints 690 outward and away from one another. When rotated in this direction, the end surfaces 660, normally hidden beneath the tray insert 600 in the in-use tray configuration, rotate forward and become exposed when the tray is collapsed along with the stroller. The contour and extent of the perimeter structure 664 that defines the end surfaces 660 can be designed to create feet 692 that project outward or forward of the tray front surface formed by the front wall 610, including the mid-section 666, as depicted in FIGS. 4 and 36. The feet 692 can combine with one or more other parts of the stroller, such as the wheels of the front wheel assemblies 118 as shown in FIG. 5, to form a stable three or four, or more, point base on which the stroller can stand upright when in the collapsed configuration. The end surfaces 660 can thus touch the ground when the stroller is in the collapsed configuration and would become scuffed and marred over time. These end surfaces 660, however, are hidden from view beneath the tray 124 in this example when the stroller is in the in-use configuration.

The front wheel assemblies 118 are described in greater detail herein with respect to FIGS. 43-46. Each front wheel assembly 118 in the disclosed example has a pair of front wheels 700 including an inner wheel and an outer wheel. Each of the front wheel assemblies provides a dual function. A first wheel suspension function is to provide a smoother ride for the occupant of the stroller 100 disclosed herein. The second is to selectively render the front wheel assemblies either fixed or locked in a forward-only direction or rotationally free to permit the wheel assemblies to turn, i.e., spin, about the lower ends 120 of the front legs 121.

Each of the front wheel assemblies 118 has a front strut housing 702 attached to the lower end 120 of the frame front legs 121. A leg receiving bore 706 is provided in each strut housing 702 for insertion of the lower end 120 in the housing. Fasteners or other suitable means can be used to secure the strut housings to the lower ends 120 of the front legs 121. In this example, each lower leg bore 706 is a through bore and has near its lower end a radially inwardly extending annular flange 710. An end cap 712 is received over the open end 714 of the lower end 120 of the front legs 121. Each end cap 712 has a downward extending stem portion 715 of a first diameter and a larger diameter head portion 716 spaced from the end cap and carried by the stem. The space between the end cap 712 and head 716 created around the smaller diameter stem 715 forms an annular groove. The lower ends 120 704 of the front legs 121 and the end cap 712 can be slipped into the leg bore 706 until the end cap reaches the inward extending flange 710 within the bore. The end cap head 716 snaps over the flange 710, which is then retained in the groove to hold the strut housings 702 on the front legs 121. With this arrangement, the strut housings 702 are free to rotate about the axis of the front legs 121.

Each strut housing 702 has a rear side 718 that carries a downward facing strut cup 720 extending rearward from the rear side. A horizontally oriented pivot 722 is carried by and extends forward from a front side 723 of the strut housing. A lock lever 724 pivots up and down about the pivot 722 and is pivotally attached at the pivot to the housing. Each wheel assembly 118 has a pair of swing arms 726. One swing arm 726 is pivotally coupled to each end of the pivot 722. A swing arm 726 extends from the front side to the back side on both sides of each strut housing 702 in this example. The rear ends 728 of the swing arms 726 each carry a horizontally oriented axle sleeve 730 with a through bore 732 extending through each sleeve.

As best shown in FIG. 43, each wheel assembly 118 includes a single elongate axle 734 with opposed ends 736. One of the wheels 700 is attached to each end 736 of each axle 734. The swing arm sleeves 730 align with one another and the axle 734 extends through the bore 732 of each swing arm on each wheel assembly 118. A strut assembly is mounted to each strut housing. Each strut assembly includes a helical spring 742 and a two-part front strut. Each front strut has an upper strut tube 744 and a telescoping strut rod 746 that is slidably received in the interior of the strut tube in this example. A lower end of the strut rod 746 includes a loop connector 748. The loop connector 750 is sandwiched between the confronting ends of the pair of swing arm sleeves 730 on each front wheel assembly and the axle 734 also passes through the loop connector. An upper end of the strut tube 744 bears against the interior surface of the strut cup 720. An upper end of the helical spring 742 bears against a downward facing surface of an annular flange 751 on the strut tube 744 in this example. Similarly, a lower end of the spring 742 in this example bears against an upward facing surface of an annular flange 752 on the strut rod 746 in this example.

In operation, the upper end of the spring 742 and strut assembly are fixed into position by the housing 702. The axle 734, the strut rod 746, and the swing arms 726 move upward against the biasing force of the spring. The telescopic movement of the strut rod 746 within the strut tube 744 permits such movement.

Figure 46:
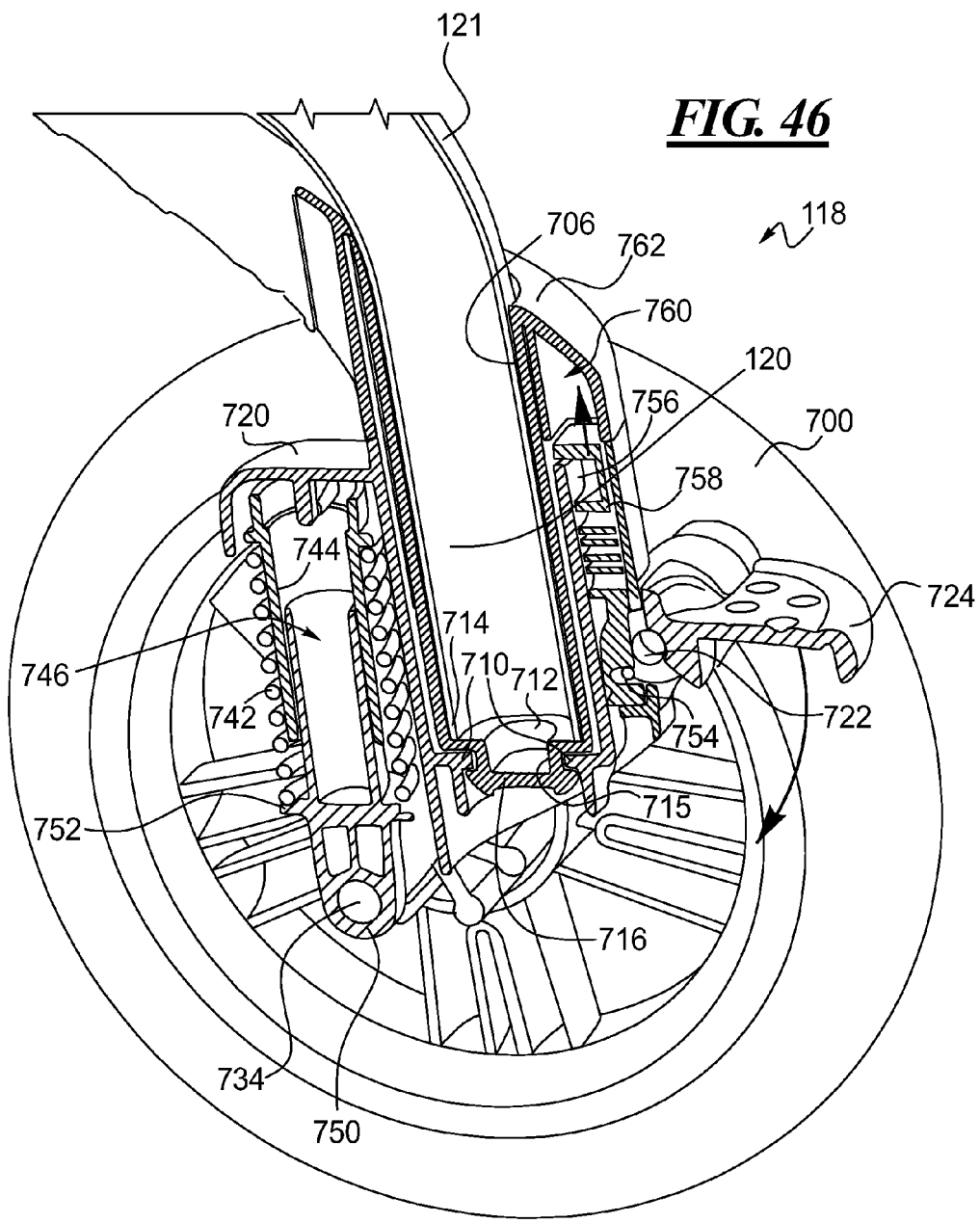
FIG. 46 is a cross section of a front wheel assembly and taken along line 46-46 of FIG. 44.

As shown in FIG. 46, the lock lever 724 of each front wheel assembly 118 pivots between a downward position and an upward position. A drive link 754 is positioned extending from the pivot 722 generally opposite the lock lever 724. A slide compartment 756 is provided on the front side of each front strut housing 702 and is oriented vertically. The drive link 754 of the lock lever is positioned within the slide housing 756 and is coupled to a slidable lock bar 758. The slide compartment 756 is formed by two adjacent parts. A portion of the slide compartment 756 is carried integrally on the front 723 of the strut housing 702, which can spin about the axis of the front leg 121. An upper end 760 of the slide compartment 756 is carried on a separate component 762 that is fixed to the lower end 120 of the front leg 121 and abuts the top of the strut housing 702. The upper end 760 of the slide compartment 756 is closed on four sides and is sized to fit the top end of the lock bar 758. The upper end 760 of the slide compartment can not rotate relative to the front leg 121.

As shown in FIG. 46, when the lock lever 724 is in the raised position, the drive link 754 draws the lock bar 758 downward so that it sits only in the lower portion of the slide compartment 756. In this position, the lock bar lies entirely below the top end of the strut housing 702. Thus, the entire front strut housing and front wheel assembly can rotate or spin freely around the axis of the front leg 121. In order to rotationally lock the front wheel assemblies 118, each lock lever is rotated to its lowered or downward position. This moves the drive link 754 in an upward direction which in turn drives the top end of the lock bar 758 upward into the upper end 760 of the slide compartment 756. The fixed position upper end 760 does not permit the lock bar to move. Thus, the front wheel assemblies 118 are locked in the forward rolling position in this lock lever position.

In the disclosed example, the separate component 762 positioned above each of the strut housings 702 also integrally provides a mounting bracket 764 for an optional front foot rest of the stroller. A front foot rest (not shown) can be mounted to the end 766 of the mounting brackets 764 on each side of the stroller and span the width of the stroller.

The stroller 100 disclosed herein can be folded to a compact collapsed size in three dimensions. The folding structures and methods are now described herein. Other than the joint assemblies, the basic parts of the stroller 100 in the disclosed example were previously described. The joint assemblies 130 are best illustrated in FIGS. 47-51. The joint assemblies 130 on each of the frame sides 102a and 102b function to latch or release many of the stroller components and to provide connection points for many of the stroller components. Only one side of the stroller is described in this section for convenience, knowing that both stroller sides are the same in this example.

In this example, the joint assemblies 130 include one of the arm rests 172. Each arm rest in this example is a curved plastic part with its rear end 800 pivotally connected at an arm rest pivot 801 to the outer side of a lower end 802 of the frame extension 128. The top surface 804 of the arm rest 172 is convex and the bottom surface 806 is concave. The arm rest extends upward and forward of the frame extension in the in-use configuration. The front end 808 of the arm rest 172 forms the open end 628 to which the tray 124 is attached.

A leg connector 810 is pivotally attached to the upper end 134 of the rear leg 123 at a leg pivot 814. The leg connector is also a plastic part and has a hollow end 816. The upper end 134 of the rear leg 123 is received in the hollow end 816. The rear leg 123 is bowed in a rearward direction and the leg connector 810 is curved to match the contour. When in the in-use configuration, the leg connector curvature and the rear leg curvature to coincide. The leg connector 810 is cut away on an underside 818 to permit the leg connector to pivot to a lesser angle relative to the leg 123 from the in-use coincident curvature.

A latch lever 820 is carried on the top or back side of the leg 123 and has a hinge part 822 that is pivotally coupled to the leg at the same leg connector pivot 814. The lever 820 has a handle part 824 extending rearward from the hinge part 822. The hinge part 822 has two spaced apart sides 826 that create a gap in which the rear leg upper end 134 is captured. A split plastic pin 828 has two halves, one each insertable through a shaped hole 830 in each of the hinge part sides 826. The pin has a shaped head 832 on each half that interlocks with the shaped holes 830 so that the pin and lever rotate together. A bore 834 through the assembled pin 828 can receive a fastener such as a bolt, rivet, or the like to secure the leg connector to the same pivot point, while permitting the leg connector to pivot independent of the lever 820.

As shown in FIGS. 47 and 48, the leg connector 810 is received over the upper end 132 of the front leg 121 and is affixed to the front leg. A slide loop 842 extends further forward from the leg connector 810. The rear extension 128 passes through the loop 842 and can slide relative to the loop. A linear coupler 850 has an elongate body and the lower end 802 of the frame extension 128 extends within and along a portion of the body over a majority of length of the coupler. The arm rest pivot 801 secures the leg extension to the coupler and pivotally connects the coupler to the arm rest. The front leg 121 extends through and along a portion of the coupler 850. The front leg is oriented parallel to the frame extension 128 along and within the coupler in this example, but can slide longitudinally along the coupler.

In the in-use configuration, a top end 852 of the coupler 850 abuts the leg connector 810 where it is fixed to the upper end 132 of the front leg 121. In the in-use configuration, the forward end of the leg connector 810 also nests within the back end 854 of the arm rest 172. Thus, the joint assembly 130 is formed by the coupler 850, the arm rest 172, and the leg connector 810 which abut and nest relative to one another in a side of the frame 102 when in the in-use configuration. A strap 860 extends from the latch lever 820 on one side to the latch lever on the other frame side and has a center grip 862. The strap 860 can be used to actuate both of the latch levers with one hand.

As shown in FIGS. 48-50, a latch assembly 870 is housed within the hollow upper end 134 of the rear leg 123. The latch assembly includes a housing 872 secured in place via the pin 828 also passing through a hole 874 in the housing. A forward extending bore 876 is provided in the bottom side 878 of the housing 874 and opens generally facing the front leg 121 and coupler 850. A spring 880 is received in the slot and biases a latch slug 882 in a forward direction also toward the coupler 850. A slot 884 is provided on each side of the housing 874 and each opens into the interior of the bore 876. A drive pin 886 extends transversely through the slug 882 and laterally through and beyond each of the slots 884. A radial arc notch 888 is formed into the perimeter edges on the bottom of each hinge part side 826. The ends of the drive pin 886 are captured between the ends 890 of the notches 888. The pin 886 is also captured within the confines of the slots 884. Thus, the slug is biased forward by the spring to a latch position where the pin 886 contacts the forward ends of the slots 884. The slug can be moved rearward only until the pin contacts the rear ends of the slots.

The latch lever 820 is pivoted to drive the slug. When the lever is lifted or rotated about its pivot at the pin 828, one end of the notch will bear against the pin 884 on each side of the housing 874 and drive the slug rearward to its release position. When the lever is released or lowered back onto the rear leg, the slug can return under force of the spring to the latched position.

The upper end 852 of the coupler 850 has a latch hole 892 facing rearward. The latch hole is sized to receive the slug. A ramp surface 994 is positioned around the latch hole so that when the joint assembly 130 of the stroller is returned to its in-use configuration, the ramp 994 will drive the slug 882 automatically to its release position until the hole 892 realigns with the slug. The spring 880 will then push the slug into the hole to latch the joint assembly 130 in the in-use configuration.

Turning to FIGS. 1-6, the collapsing structure and function is now described. From the in-use configuration, a user grasps the strap 860 by the grip 862 using one hand and lifts upward. The latch levers 820 will rise, releasing the latch slug 882 from the latch holes 892 in both sides of the stroller. The user also presses the button 562 of the upper brace 150 into the handle assembly 502. This releases the upper cross-brace and renders it loose. By further lifting the strap, the stroller will collapse in the following manner.

The leg connectors 810 will pivot about the upper ends 134 of the legs 123 and release from the arm rests 172. The upper ends of the front legs, fixed inside the leg connectors, are then able to move upward away from the couplers 850. The couplers 850 will slide down the front legs 121, as will the frame extensions 128, which are fixed within the couplers. The lower rear cross-brace 160 will pivot about the hub 162 and the rear wheel assemblies will fold inward between the rear legs 123. The frame sides 102*a* and 102*b* will collapse toward one another. The seat cross-members will collapse laterally to accommodate.

As the coupler 850 slide down the front legs 121, the arm rests 172, which are pivotally connected to the couplers will fold down upon the couplers and also slide down the front legs. The arm rests push the links 170 downward applying downward force upon the front ends 165 of the seat side links 164, which are also pivotally coupled to the couplers 850. The seat bottom cross-member 136 collapses upward from the rear ends of its links as do the seat side links. The seat back risers collapse toward the frame extensions 128 and toward one another. The rear legs 123 collapse forward toward the couplers 850 as the couplers slide down the front legs. FIGS. 4-6 show the stroller 100 in the collapsed configuration.

To unfold the stroller 100 to the in-use condition, the reverse steps are applied, except that the strap 860 need not be utilized. The lower cross-brace can be pushed down to fully expand it, but the torsion spring in the hub will assist in unfolding the brace as well as other The handles 126 can be manipulated to push down on the stroller in order to pivot the rear legs and front legs apart to further unfold the stroller. The handles can be pushed down until the latch slugs pop into the latch holes in the joint assemblies. The upper brace 150 will become stiff when the parts linearly align.

The under-seat basket access aspects of the invention are described in detail herein with respect to FIGS. 1-3, 52, and 53. The stroller 100 disclosed herein provides a significant improvement for under-seat basket access over previous known three-dimensionally collapsible strollers. As described previously, the rear stroller legs 123 and the lower cross-brace 160 are positioned such that the lower brace is at a significantly low elevation. In this example, the lower cross-brace 160 is collapsible, provides significant structural stability to the stroller 100 when in the in-use configuration, and yet is positioned fairly near the rear wheel assemblies 119. There is no X-shaped cross-member or other linkage in the stroller 100 that inhibits access to the storage region or area 113 via an access opening 900 defined between the rear legs 123, the lower cross-brace 160, and the underside of the seat 104 in this example. The transverse release strap 860 can easily be moved out of the way if a user needs full access to this region. Alternatively, the release strap in another example need not be so loose that it hangs downward (see FIGS. 54 and 55). Instead, the strap can be fairly taut so that it stretches nearly straight across the width of the stroller.

As a result, a user can access the region 113 defined between the rear frame legs 123, the lower cross-brace 160, and the underside of the seat 104. If desired, a storage surface can be provided suspended beneath and spaced from an underside of the stroller seat and can have fabric, semi-rigid, or rigid side walls that extend upward. The side wall or rear panel at the rear side of the stroller can be suspended by a fabric strap that is easily separable from the rear panel of the basket wall.

In one example, the rear basket wall can be substantially vertically oriented or can be aligned with the rear legs whether straight or curved. In another example, the side walls of a storage space underneath the seat can extend rearward beyond the rear legs to a desired distance. The fabric or other rear panel of the storage area can be angled rearwardly providing even greater access to the storage space underneath the seat 104 because no inhibiting stroller frame structure is located in the access opening. In such an example, the user need not lower the rear panel in order to access the space. The opening for many instances would be large enough simply because the rear wall extends rearward enough to create a significant access opening.

In one example, the access opening 900 can be the entire area above the rear cross-brace 160, below the seat bottom 108, and between the rear legs 123. In another example the access opening can have a bottom boundary defined by a rear wall or panel of the storage area 133, such as a basket panel. In another example, the rear wall can be such that it can be lowered out of the way to enlarge the access opening when needed. This is again because there is no inhibiting frame structure in the way.

Figure 52:
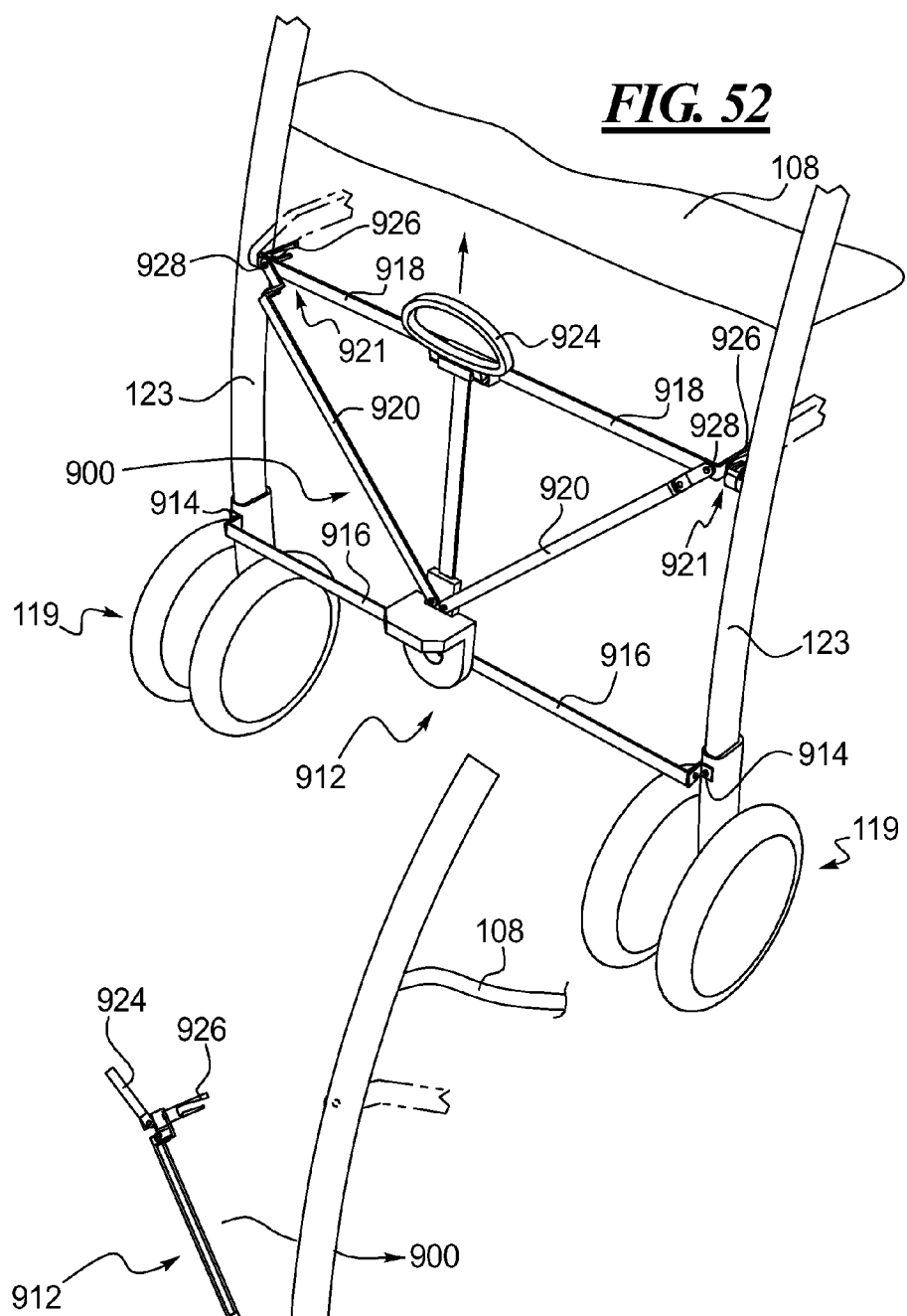
FIG. 52 is a rear perspective view of an alternative embodiment of a three-dimensionally foldable stroller.
Figure 53:
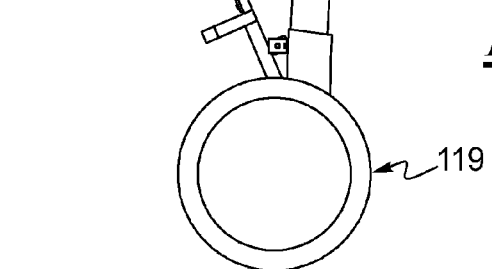
FIG. 53 is a side view of the stroller of FIG. 52 with a part of the rear cross-brace structure pivoted out of the way of the under seat storage space access.

FIGS. 52 and 53 illustrate another alternative embodiment of a three-dimensionally foldable stroller 910 wherein the stroller does not include a lower cross-brace 160 or the prior example. Instead, the stroller 910 can include a structure in the form of a multi-part bracing system 912, similar to those found in prior art three-dimensionally foldable strollers. However, in this example, the structure 912 can be pivotally mounted at the bottom outer corners 914 to the rear legs 123. The type of structure can vary and yet fall within the spirit and scope of the present invention. For example, a conventional X-shaped cross-brace or a more complex cross-brace structure can be used.

The disclosed example utilizes a pair of vertically spaced apart cross-members 916 and 918, each pivotally collapsible in the middle and pivotally attached to the rear legs 123. The lower cross-member ends define the outer bottom corners 914 of the structure 912 in this example. A pair of transverse braces 920 extends one each from the middle of the lower cross-member 916 to the opposite outer ends of the upper cross-member 918. These braces 920 are also pivotable about both of their ends. The junction between the upper cross-member 918 and the top ends of the braces 920 define outer upper corners 921 of the structure 912.

The structure 912 also has a vertical strut 922 extending between the middle of the two horizontal cross-members 916 and 918. A handle 924 is attached to the middle of the upper cross-member 918. When collapsing the stroller 910, the handle is lifted to collapse the structure upward and inward upon itself. In this example, the upper corners 921 of the structure 912 are removably attached to the rear legs 123 as shown in FIGS. 52 and 53.

In the in-use condition, the upper corners 921 of the cross-brace structure 912 are attached to the rear legs 123 to provide structural stability to the stroller. These can remain attached as the stroller is collapsed because the structure 912 can collapse in a scissor-like fashion. However, if a user wishes to have clear access to the storage space beneath the seat 104, they can detach the upper corners 921 from the rear legs 123 and rotate the structure 912 about the bottom corners 914 and out of the way for clear and full access to the storage space beneath the seat as shown in FIG. 53. The top corners 921 can have detachable slots, pins, latches, or other devices 926 on the structure 912 that are coupled to pins, brackets, latches, or other devices on the rear legs 123, as long as the structure can be retain on the legs and selectively detached from the legs in this example.

In an alternative embodiment, the structure can be pivoted at its top end and rotated upward out of the way. In a further additional embodiment, one side of the structure can be pivotally attached and the other side removably attached so that the structure can be rotated either left or right to clear the access opening of the storage space.

Figure 54:
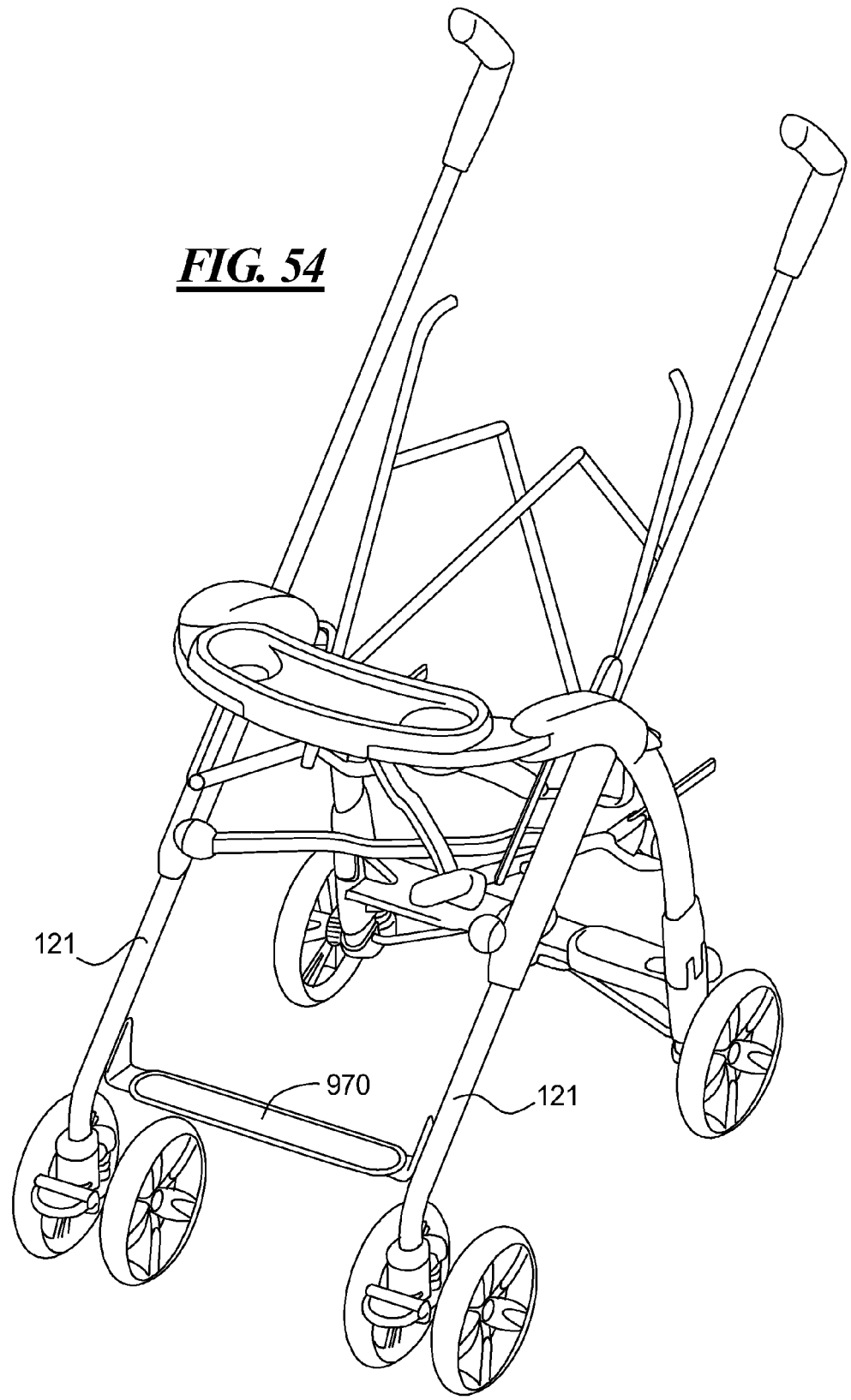
FIG. 54 is a perspective view of a three-dimensionally collapsible stroller with all soft goods removed.
Figure 55:
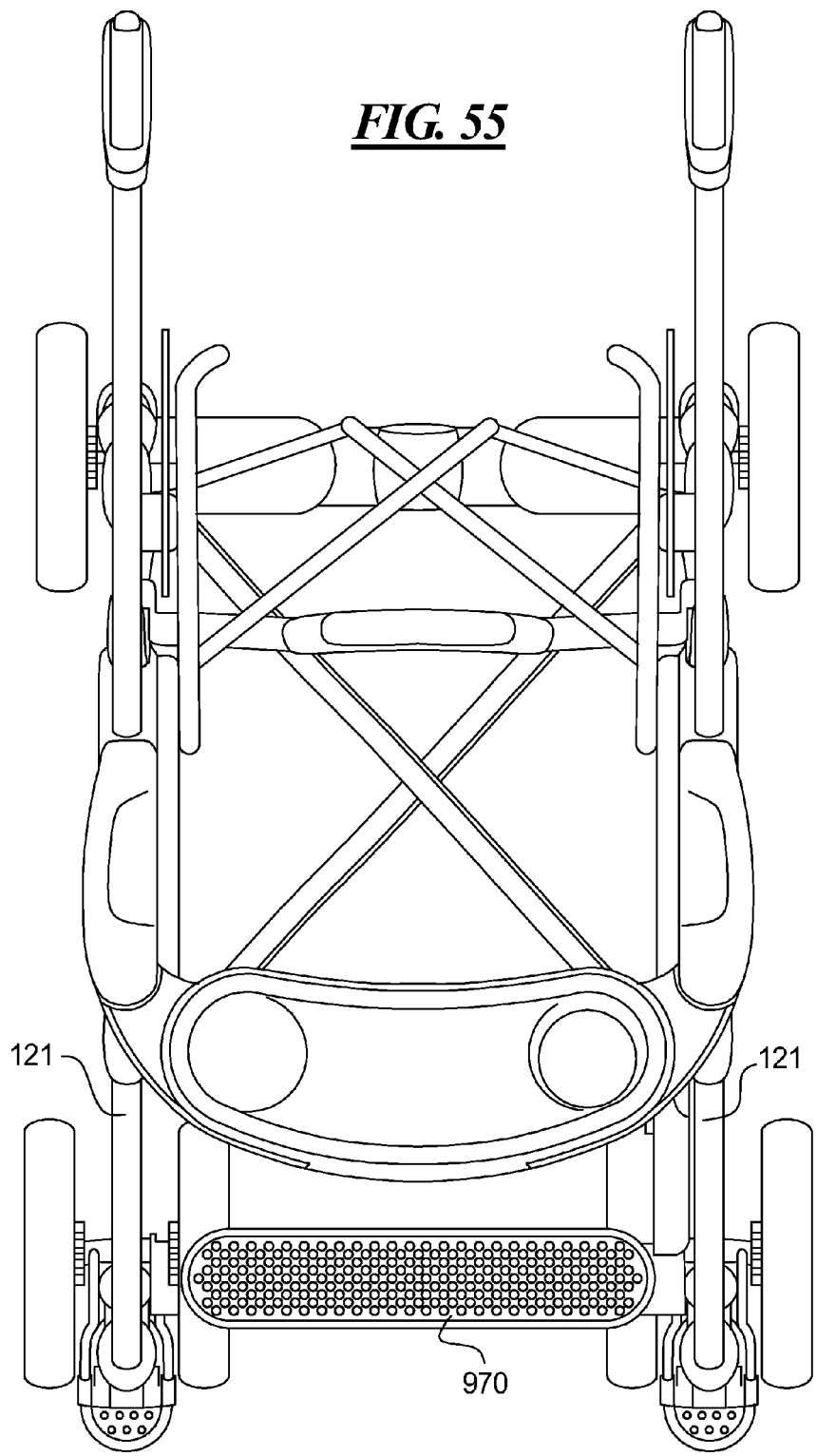
FIG. 55 is a top view of the stroller of FIG. 54.

FIG. 54 is a perspective view of a three-dimensionally collapsible stroller with all soft goods removed. This stroller frame structure is substantially similar to that of the stroller 100 described herein. The frame assembly components are clearly visible in this view. A footrest 970 extends across the frame structure and is mounted directly to the front legs 121 in this example. In an alternate example, the foot rest could be mounted to the previously described brackets 764 and mounts 766 on the additional part 762 carried on the front strut housings 702. Also, the upper cross-brace 150 is not present in this example. FIG. 55 is a top view of the stroller of FIG. 54 and clearly shows the lever strap 860, the seat bottom cross-member 136 and seat back risers 142 and the cross-links 143 and 144.

Although certain collapsible stroller structures, features, subassemblies, and methods have been described herein in accordance with the teachings of the present disclosure, the scope of coverage of this patent is not limited thereto. On the contrary, this patent covers all embodiments of the teachings of the disclosure that fairly fall within the scope of permissible equivalents.

What is claimed is:

1. A stroller comprising:
    a frame structure with spaced apart left and right sides, the frame structure collapsible from an in-use arrangement to a compact arrangement;
    a seat supported between the sides of the frame structure;
    a front leg on each side of the frame structure;
    a front wheel assembly and at least one wheel on a lower end of each front leg;
    a bracket extending from each front wheel assembly, each bracket providing an attachment point at an elevation above the respective front wheel assembly and spaced from the respective front leg;
    a foot rest attached to each of the attachment points;
    a tray positioned in front of and spaced from the seat; and
    one or more feet at least partly hidden by the tray with the frame structure in the in-use arrangement, wherein the one or more feet are exposed and project from a front of the tray with the frame structure in the compact arrangement, wherein the stroller can stand upright on the one or more feet and the wheels in the compact arrangement.

2. A stroller according to claim 1, wherein a slidable part of the frame structure can slide along the front leg on each side of the frame structure, and with the frame structure in the compact arrangement, each slidable part is slid downward on the respective front leg below the elevation of the foot rest attachment points.

3. A stroller according to claim 1, wherein the frame structure is collapsible in vertical, horizontal, and side-to-side lateral directions, and wherein both the foot rest and the tray are collapsible in a side-to-side direction.

4. A stroller according to claim 1, wherein the tray includes a pair of the feet that each pivot from a hidden position beneath the tray to the extended position projecting forward from the tray when the frame structure is collapsed from the in-use arrangement to the compact arrangement.

5. A stroller according to claim 1, further comprising:
    a pair of handle assemblies positioned rearward of the seat for pushing the stroller, each handle assembly having an actuator and a grip part that extends radially from an axis, wherein the grip part is positionally adjustable along the axis and rotationally adjustable about the axis upon movement of the actuator.

6. A collapsible stroller comprising:
    a frame structure with two laterally spaced sides, the frame structure being three-dimensionally collapsible lengthwise, width-wise, and height-wise from an in-use configuration to a compact configuration;
    a seat supported between the sides of the frame structure and having a seat bottom;
    a tray connected to the sides of the frame structure and positioned forward of the seat, wherein the tray is width-wise collapsible along with the frame structure;
    a front leg on each side of the frame structure;
    a front wheel assembly attached to a lower end of each front leg, each front wheel assembly having at least one front wheel;
    a rear leg on each side of the frame structure and each having a lower end;

a frame extension on each side of the frame structure and each extending rearward of the seat;

an upper cross-brace extending between and connected to each of the frame extensions, the cross-brace carrying a cup holder and being reconfigurable between a stiff condition and a loose condition;

a lower cross-brace extending between and interconnecting the lower ends of the rear legs, the lower cross-brace being width-wise collapsible about a center hub and being horizontally oriented with the frame structure in the in-use configuration: and a pair of feet that are at least partly hidden by the tray with the frame structure in the in-use configuration and that extend from the tray with the frame structure in the compact configuration, wherein the stroller can stand upright on the pair of feet and the front wheels in the compact configuration.

7. A collapsible stroller according to claim 6, further comprising:

a storage basket beneath the seat bottom; and an access opening to the storage basket located between the rear legs, the frame structure configured such that the access opening can be the entire space between the rear legs above the lower-cross brace and beneath the seat bottom.

8. A collapsible stroller according to claim 6, further comprising:

a rear wheel near the lower end of each of the rear legs;

a brake mechanism located at each rear wheel; and a brake lever carried on the hub of the cross-brace and coupled to the brake mechanism on each rear wheel, the brake lever selectively movable to set the brake at each rear wheel preventing the rear wheels from rotating and to release the brake at each rear wheel permitting the rear wheels to rotate.

9. A collapsible stroller according to claim 8, wherein the rear wheels on the rear legs bend move toward one another and move inward relative to an axis of the lower ends of their respective rear legs when the frame structure is collapsed.

10. A collapsible stroller according to claim 8, wherein each brake mechanism has a cable coupled to the brake lever at the hub and configured to set or release the respective brake mechanism.

11. A collapsible stroller according to claim 6, further comprising:

a foot rest extending between the front legs and being width-wise collapsible along with the frame structure, each end of the foot rest attached to a distal end of a bracket that extends upward and rearward from a part of each front wheel assembly.

12. A collapsible stroller according to claim 6, further comprising:

a foot rest positioned beneath a front edge of the seat and connected to the sides of the frame structure, wherein the foot rest is width-wise collapsible along with the frame structure.

13. A collapsible stroller according to claim 6, further comprising:

a handle assembly on the end of each frame extension, each handle assembly having a grip part that extends radially outward from the respective frame extension, wherein each grip part is both rotationally adjustable about an axis of the respective frame extension and slidably adjustable along the axis of the respective frame extension.

14. A collapsible stroller according to claim 6, further comprising:

a frame latch on each side of the frame structure;

a release strap extending between and interconnecting the latches; and a release button on the upper cross-brace, wherein the stroller can be collapsed by depressing the release button to reconfigure the upper cross-brace and lifting the release strap upward to release the frame latches.

15. A stroller comprising:

a frame structure having left and right sides, the frame structure being three-dimensionally collapsible in length, height, and side-to-side width directions from an in-use configuration to a collapsed configuration;

a seat supported between the left and right sides of the frame structure, the seat having a seat bottom;

a tray between the left and right sides of the frame structure in front of the seat;

a front leg on each of the left and right sides of the frame structure;

a front wheel carried on the lower end of each front leg;

a handle extension on each of the left and right sides of the frame structure, each handle extension at least partly extending rearward of the seat;

an upper cross-brace extending between the handle extensions behind the seat and being reconfigurable between a stiff condition and a loose condition;

a foot rest extending between lower ends of the front legs, wherein both the upper cross-brace and the foot rest each are collapsible in a side-to-side width direction along with the frame structure; and a foot provided on and at least partly hidden by a part of the tray with the frame structure in the in-use configuration, wherein the foot extends from the tray with the frame structure in the collapsed configuration, and wherein the stroller can stand upright on the foot and the front wheels in the collapsed configuration.

16. A stroller according to claim 15, further comprising:

a cup holder on the upper cross-brace, the cup holder remaining as part of the upper cross-brace when the frame structure is collapsed.

17. A stroller according to claim 15, wherein the tray is collapsible in a side-to-side width direction along with the frame structure.

18. A stroller according to claim 15, further comprising:

a release button on the upper cross-brace that can be actuated to reconfigure the upper cross-brace from a stiff condition to a loose, collapsible condition while the frame structure is in the in-use configuration.

19. A stroller according to claim 15, further comprising:

a handle assembly coupled to an end of each of the handle extensions, each handle assembly having an adjustable grip portion oriented generally perpendicular relative to an axis of the respective handle extension; and an actuator on each handle assembly, wherein each grip portion is simultaneously adjustable both positionally along the axis and rotationally around the axis of the respective handle extension by actuation of the respective actuator.

20. A stroller according to claim 15, further comprising:

a rear leg on each of the left and right sides of the frame structure, each rear leg having a lower end;

a rear wheel assembly on the lower end of each rear leg; and a lower cross-brace extending between the lower ends of the rear legs, the lower cross-brace having a generally linear configuration with the frame structure in the in-use configuration and being collapsible in the side-to-side with the frame structure.

21. A stroller according to claim 20, further comprising:
a brake assembly on each rear wheel assembly; and
a brake lever carried on the cross-brace and actuable to set the brake assembly at each rear wheel to a selected one of the braking configuration and the free wheeling configuration.

22. A stroller according to claim 21, further comprising:
a hub separating the cross-brace into two sections that are pivotable about the hub relative to one another, the brake lever being carried on the hub.

23. A stroller according to claim 20, further comprising:
a storage basket beneath the seat bottom; and
an access opening to the storage basket between the rear legs above lower-cross-brace, wherein the access opening is unobstructed by any other part of the stroller between the lower cross-brace and the seat bottom.

24. A collapsible stroller comprising:
a frame structure with two laterally spaced sides, the frame structure being three-dimensionally collapsible lengthwise, width-wise, and height-wise from an in-use configuration to a compact configuration;
a seat supported between the sides of the frame structure and having a seat bottom;
a rear leg on each side of the frame structure and each having a lower end;
a frame extension on each side of the frame structure and each extending rearward of the seat;
an upper cross-brace extending between and connected to each of the frame extensions, the cross-brace carrying a cup holder and being reconfigurable between a stiff condition and a loose condition;
a lower cross-brace extending between and interconnecting the lower ends of the rear legs, the lower cross-brace being width-wise collapsible about a center hub and being horizontally oriented with the frame structure in the in-use configuration;
a front leg on each side of the frame structure;
a front wheel assembly attached to a lower end of each front leg, each front wheel assembly having at least one front wheel;
a tray connected to the sides of the frame structure and positioned forward of the seat, wherein the tray is widthwise collapsible along with the frame structure; and
a pair of feet at least partly hidden by the tray with the frame structure in the in-use configuration and that extend from the tray with the frame structure in the compact configuration, wherein the stroller can stand upright on the pair of feet and the front wheels in the compact configuration.

25. A collapsible stroller comprising:
a frame structure with two laterally spaced sides, the frame structure being three-dimensionally collapsible lengthwise, width-wise, and height-wise from an in-use configuration to a compact configuration;
a seat supported between the sides of the frame structure and having a seat bottom;
a front leg on each side of the frame structure;
a front wheel assembly attached to a lower end of each front leg, each front wheel assembly having at least one front wheel;
a rear leg on each side of the frame structure and each having a lower end;
a frame extension on each side of the frame structure and each extending rearward of the seat;
an upper cross-brace extending between and connected to each of the frame extensions, the cross-brace carrying a cup holder and being reconfigurable between a stiff condition and a loose condition;
a lower cross-brace extending between and interconnecting the lower ends of the rear legs, the lower cross-brace being width-wise collapsible about a center hub and being horizontally oriented with the frame structure in the in-use configuration;
a foot rest extending between the front legs and being width-wise collapsible along with the frame structure, each end of the foot rest attached to a distal end of a bracket that extends upward and rearward from a part of each front wheel assembly;
a tray between the two laterally spaced sides of the frame structure in front of the seat; and
a foot provided on and at least partly hidden by a part of the tray with the frame structure in the in-use configuration, and wherein the stroller can stand upright on the foot and the front wheels in the collapsed configuration.

26. A stroller comprising:
a frame structure having left and right sides, the frame structure being three-dimensionally collapsible in length, height, and side-to-side width directions from an in-use configuration to a collapsed configuration;
a seat supported between the left and right sides of the frame structure, the seat having a seat bottom;
a front leg on each of the left and right sides of the frame structure;
a handle extension on each of the left and right sides of the frame structure, each handle extension at least partly extending rearward of the seat;
an upper cross-brace extending between the handle extensions behind the seat;
a foot rest extending between lower ends of the front legs, wherein both the upper cross-brace and the foot rest each are collapsible in a side-to-side width direction along with the frame structure;
a tray between the left and right sides of the frame structure in front of the seat;
a front wheel carried on the lower end of each front leg; and
a foot provided on and at least partly hidden by a part of the tray with the frame structure in the in-use configuration, and wherein the stroller can stand upright on the foot and the front wheels in the collapsed configuration.

* * * * *